(12) United States Patent
McNaughton

(10) Patent No.: US 11,299,241 B2
(45) Date of Patent: Apr. 12, 2022

(54) WAKE SHAPING APPARATUS AND RELATED TECHNOLOGY

(71) Applicant: McNaughton Incorporated, Plymouth, MN (US)

(72) Inventor: Patrick James McNaughton, Plymouth, MN (US)

(73) Assignee: MCNAUGHTON INCORPORATED, Plymouth, MN (US)

( * ) Notice: Subject to any disclaimer, the term of this patent is extended or adjusted under 35 U.S.C. 154(b) by 100 days.

(21) Appl. No.: 16/251,742

(22) Filed: Jan. 18, 2019

(65) Prior Publication Data

US 2019/0152563 A1    May 23, 2019

Related U.S. Application Data

(63) Continuation of application No. 15/858,779, filed on Dec. 29, 2017, now Pat. No. 10,183,726.
(Continued)

(51) Int. Cl.
*B63B 34/75* (2020.01)
*B63B 1/32* (2006.01)
(Continued)

(52) U.S. Cl.
CPC ............... *B63B 34/75* (2020.02); *B63B 1/32* (2013.01); *B63B 34/70* (2020.02);
(Continued)

(58) Field of Classification Search
CPC ............... B63B 2001/005; B63B 1/32; B63B 2001/325; B63B 34/70; B63B 34/75; Y02T 70/10

See application file for complete search history.

(56) References Cited

U.S. PATENT DOCUMENTS 2,127,154 A    8/1938   Burk
3,159,134 A   12/1964   Winnen
(Continued)

FOREIGN PATENT DOCUMENTS

WO    2013071148 A1    5/2013

OTHER PUBLICATIONS

Welcome Aboard—Suction Cleat, pp. 1-2, Nov. 29, 2010, Welcome Aboard Catalog, http://www.welcome-aboard.com/prodinfo/asp?number=SC1001, retrieved from Internet Wayback Archive Machine, http://www.wayback.archive.org/web on Dec. 7, 2017.
(Continued)

*Primary Examiner* — Ajay Vasudeva
(74) *Attorney, Agent, or Firm* — Fredrikson & Byron, P.A.

(57) ABSTRACT

The invention provides an apparatus that attaches to a hull of a boat to disrupt water flow around the hull such that a wake created behind the boat is larger, differently positioned, and/or differently shaped. The apparatus includes a base and a blade. The blade is equipped with a mount structure that attaches the base to the blade. The blade can be reversibly mountable to the base such that either face of the blade faces a desired direction. The apparatus provides tool-free adjustment between a first configuration in which the base is mounted to the blade and a second configuration in which the base and the blade are separated. In some embodiments, the apparatus is removably attached to the hull by one or more suction cups. Additionally, the apparatus can be inflatable. The invention further provides a deployable lanyard assembly and a splash deflector for use with the apparatus.

12 Claims, 38 Drawing Sheets

Related U.S. Application Data

(60) Provisional application No. 62/551,621, filed on Aug. 29, 2017.

(51) Int. Cl.
    *B63B 1/00*     (2006.01)
    *B63B 34/70*     (2020.01)

(52) U.S. Cl.
    CPC ... *B63B 2001/005* (2013.01); *B63B 2001/325* (2013.01); *Y02T 70/10* (2013.01)

(56) References Cited

U.S. PATENT DOCUMENTS

| | | | |
|---|---|---|---|
| 3,180,604 A * | 4/1965 | Hammer | G03B 42/025 |
| | | | 248/205.8 |
| 3,247,820 A | 4/1966 | White | |
| 3,291,094 A | 12/1966 | Beebe | |
| 3,704,679 A | 12/1972 | Haynes et al. | |
| 3,704,976 A | 12/1972 | Petersen | |
| 3,747,138 A | 7/1973 | Morgan | |
| 3,769,927 A | 11/1973 | Carney | |
| 3,918,666 A | 11/1975 | Florian | |
| 3,974,794 A | 8/1976 | Kakitani et al. | |
| 4,043,531 A | 8/1977 | Green | |
| 4,328,761 A | 5/1982 | Dwyer | |
| D292,392 S * | 10/1987 | Zepp | D12/317 |
| 4,846,429 A | 7/1989 | Scheurer et al. | |
| 5,070,803 A | 12/1991 | Smith | |
| 5,184,858 A | 2/1993 | Arai | |
| 5,215,029 A * | 6/1993 | Davis | B63B 39/061 |
| | | | 114/274 |
| 5,224,436 A | 7/1993 | Stricker | |
| 5,549,071 A | 8/1996 | Pigeon et al. | |
| 5,611,295 A | 3/1997 | Stables | |
| 5,676,085 A * | 10/1997 | Michl, Jr. | B63B 21/00 |
| | | | 114/230.1 |
| 5,715,876 A | 2/1998 | Burt | |
| 5,860,384 A | 1/1999 | Castillo | |
| 5,860,766 A | 1/1999 | Lochtefeld et al. | |
| 5,934,963 A | 8/1999 | Frizzell | |
| 5,975,974 A | 11/1999 | McCausland | |
| 6,006,689 A | 12/1999 | Olofsson | |
| 6,012,408 A | 1/2000 | Castillo | |
| 6,047,657 A | 4/2000 | Cox | |
| 6,105,527 A | 8/2000 | Lochtefeld et al. | |
| 6,154,929 A | 12/2000 | Dwyer | |
| 6,167,830 B1 | 1/2001 | Pilger | |
| 6,520,104 B1 | 2/2003 | Svensson | |
| 6,523,489 B2 | 2/2003 | Simard et al. | |
| 6,606,959 B1 | 8/2003 | Shen | |
| D481,665 S | 11/2003 | Kinkead | |
| 6,712,016 B1 | 3/2004 | Morisch et al. | |
| 6,807,920 B1 | 10/2004 | Wynne | |
| 6,863,011 B2 | 3/2005 | Kinkead | |
| 6,874,441 B2 | 4/2005 | Pigeon | |
| 6,941,884 B2 | 9/2005 | Moore | |
| 6,991,504 B1 | 1/2006 | English et al. | |
| 7,004,097 B2 | 2/2006 | Zeromski | |
| 7,063,031 B2 | 6/2006 | Earl, Jr. et al. | |
| 7,140,318 B1 | 11/2006 | Gasper | |
| 7,174,843 B1 | 2/2007 | Tossavainen | |
| 7,182,037 B2 | 2/2007 | Otobe et al. | |
| 7,189,127 B2 | 3/2007 | Otobe et al. | |
| 7,201,111 B1 | 4/2007 | Burkett | |
| 7,229,059 B1 | 6/2007 | Hood | |
| 7,252,047 B1 | 8/2007 | Baucom, Jr. | |
| 7,434,531 B1 | 10/2008 | Zsido et al. | |
| 7,475,652 B2 | 1/2009 | Dvorak | |
| 7,617,026 B2 | 11/2009 | Gee et al. | |
| 7,665,706 B2 | 2/2010 | Chien et al. | |
| 7,707,956 B2 | 5/2010 | Moore | |
| 8,282,434 B2 | 10/2012 | Kumano | |
| 8,336,447 B2 | 12/2012 | Jarisch et al. | |
| 8,387,932 B2 | 3/2013 | Takahashi et al. | |
| 8,453,591 B2 | 6/2013 | Mannerfelt et al. | |
| 8,534,214 B1 | 9/2013 | Gasper | |
| 8,539,897 B1 * | 9/2013 | Gasper | B63B 32/70 |
| | | | 114/284 |
| 8,573,837 B2 | 11/2013 | Matsudo et al. | |
| 8,578,837 B1 | 11/2013 | Burhoe | |
| 8,667,917 B2 | 3/2014 | Brewer | |
| 8,833,286 B1 | 9/2014 | Sheedy et al. | |
| 8,851,434 B2 | 10/2014 | Menning et al. | |
| 8,967,070 B2 | 3/2015 | Kalil | |
| 9,032,897 B2 | 5/2015 | Argo | |
| 9,038,560 B1 | 5/2015 | Brendel | |
| 9,260,161 B2 | 2/2016 | Gasper et al. | |
| 9,296,447 B1 | 3/2016 | Morgan et al. | |
| 9,334,022 B2 | 5/2016 | Gasper et al. | |
| 9,371,115 B2 | 6/2016 | Hammerstrom et al. | |
| 9,422,028 B2 * | 8/2016 | Wilhelm | B63B 1/18 |
| 9,493,213 B2 | 11/2016 | Thomas | |
| 9,540,074 B1 | 1/2017 | Pigeon | |
| 9,604,700 B2 | 3/2017 | Naples | |
| 9,611,006 B1 | 4/2017 | Miller et al. | |
| 9,834,280 B1 * | 12/2017 | Wilmoth, III | B63B 1/32 |
| 9,908,596 B2 | 3/2018 | Watson | |
| 9,914,509 B1 | 3/2018 | Tegeder | |
| 10,183,726 B1 * | 1/2019 | McNaughton | B63B 34/75 |
| 2007/0216154 A1 | 9/2007 | Casagrande | |
| 2007/0257167 A1 | 11/2007 | Richter | |
| 2008/0190348 A1 | 8/2008 | Baker | |
| 2013/0213293 A1 | 8/2013 | Gasper et al. | |
| 2013/0228113 A1 | 9/2013 | Gasper et al. | |
| 2013/0228115 A1 | 9/2013 | Gasper et al. | |
| 2014/0137786 A1 | 5/2014 | Gasper et al. | |
| 2014/0137787 A1 | 5/2014 | Gasper et al. | |
| 2014/0261135 A1 | 9/2014 | Gasper et al. | |
| 2016/0009342 A1 | 1/2016 | Thomas | |
| 2016/0340948 A1 | 11/2016 | McCullough | |
| 2017/0233038 A1 | 8/2017 | Clover et al. | |

OTHER PUBLICATIONS

Karbassi, "Vacuum Systems for Successful Robot Implementation," Robotics Tomorrow, retrieved online from <https://www.roboticstomorrow.com/article/2013/10/vacuum-systems-for-successful-robot-implementation/206>, Oct. 15, 2013, 15 pages.

"SC 1001 Suction Cleat," ProStock Marine, Retrieved online from Internet Wayback Archive Machine, https://web.archive.org/web/20160428160727/http://www.prostockmarine.com/index.php?id_product=72&controller=product, dated Apr. 28, 2016, 2 pages.

"Accessories Overview: Maintenance Packs," NautiBuoy Marine, Retrieved online from Internet Wayback Archive Machine, https://web.archive.org/web/20170604125131/http://nautibuoymarine.com/accessories-overview/maintenance-pack/, dated Jun. 4, 2017, 5 pages.

"Accessories Overview: Maintenance Packs," NautiBuoy Marine, Retrieved online from http://nautibuoymarine.com/accessories-overview/maintenance-pack/ on Mar. 14, 2018, 9 pages.

"Vacuum Lifters—Below-The-Hook Lifters," Retrieved online from Internet Wayback Archive Machine, https://web.archive.org/web/20170316134423/https://www.wpg.com/catalog/below-the-hook-lifters, dated Mar. 16, 2017, 5 pages.

"Vacuum Lifters—Below-The-Hook Lifters," Retrieved online from https://www.wpg.com/catalog/below-the-hook-lifters on Mar. 14, 2108, 5 pages.

"Vertical Lifters," Retrieved online from Internet Wayback Archive Machine, https://web.archive.org/web/20170316164448/http://www.wpg.com:80/catalog/below-the-hook-lifters/vertical-lifters, dated Mar. 16, 2017, 3 pages.

"Vertical Lifters," Retrieved online from https://www.wpg.com/catalog/below-the-hook-lifters/vertical-lifters on Mar. 14, 2018, 3 pages.

"Vacuum Mounting Cups," Retrieved online from Internet Wayback Archive Machine, https://web.archive.org/web/20170316134559/http://www.wpg.com:80/catalog/vacuum-mounting-cups, dated Mar. 16, 2017, 4 pages.

"Vacuum Mounting Cups," Retrieved online from https://www.wpg.com/catalog/vacuum-mounting-cups on Mar. 14, 2018, 4 pages.

(56) References Cited

OTHER PUBLICATIONS

"AKUA Bass Boat Fender," Pro Boating Supply, Retrieved online from https://proboatingsupply.com/shop/akua-bass-boat-fender/ on Mar. 14, 2018.
"Vacuum Mount Cleats," Yacht Innovations, Retrieved online from Internet Wayback Archive Machine, https://web.archive.org/web/20170515041410/http://vacuumcleat.yachtinnovations.com:80/, dated May 15, 2017, 2 pages.
U.S. Appl. No. 15/467,954, Third-Party Submission Under 37 CFR 1.290 and Concise Explanation of Relevance filed Sep. 13, 2017, 6 pages.
U.S. Appl. No. 15/467,954, Third-Party Submission Under 37 CFR 1.290 and Concise Explanation of Relevance filed Dec. 7, 2017, 10 pages.
Unpublished copending Design U.S. Appl. No. 29/624,039, entitled Portable Wake Enhancing Device, filed Oct. 30, 2017, 17 pages.
"Swell Wakesurf," Swell Wakesurf, Retrieved online from Internet Wayback Archive Machine, https://web.archive.org/web/20170724073524/https://www.swellwake.com/, dated Jul. 24, 2017, 4 pages.
"Wakesurf Shaper," Ronixwake, Retrieved online from Internet Wayback Archive Machine, https://web.archive.org/web/20170331023700/http://www.ronixwake.com:80/Product/wakesurf-shaper, dated Mar. 31, 2017, 2 pages.
"DELTA Wake Shaper," Mission LLC, Retrieved online from Internet Wayback Archive Machine, https://web.archive.org/web/20161126085129/http://www.missionboatgear.com:80/collections/delta-wakesurf-panel, dated Nov. 26, 2016, 17 pages.

* cited by examiner

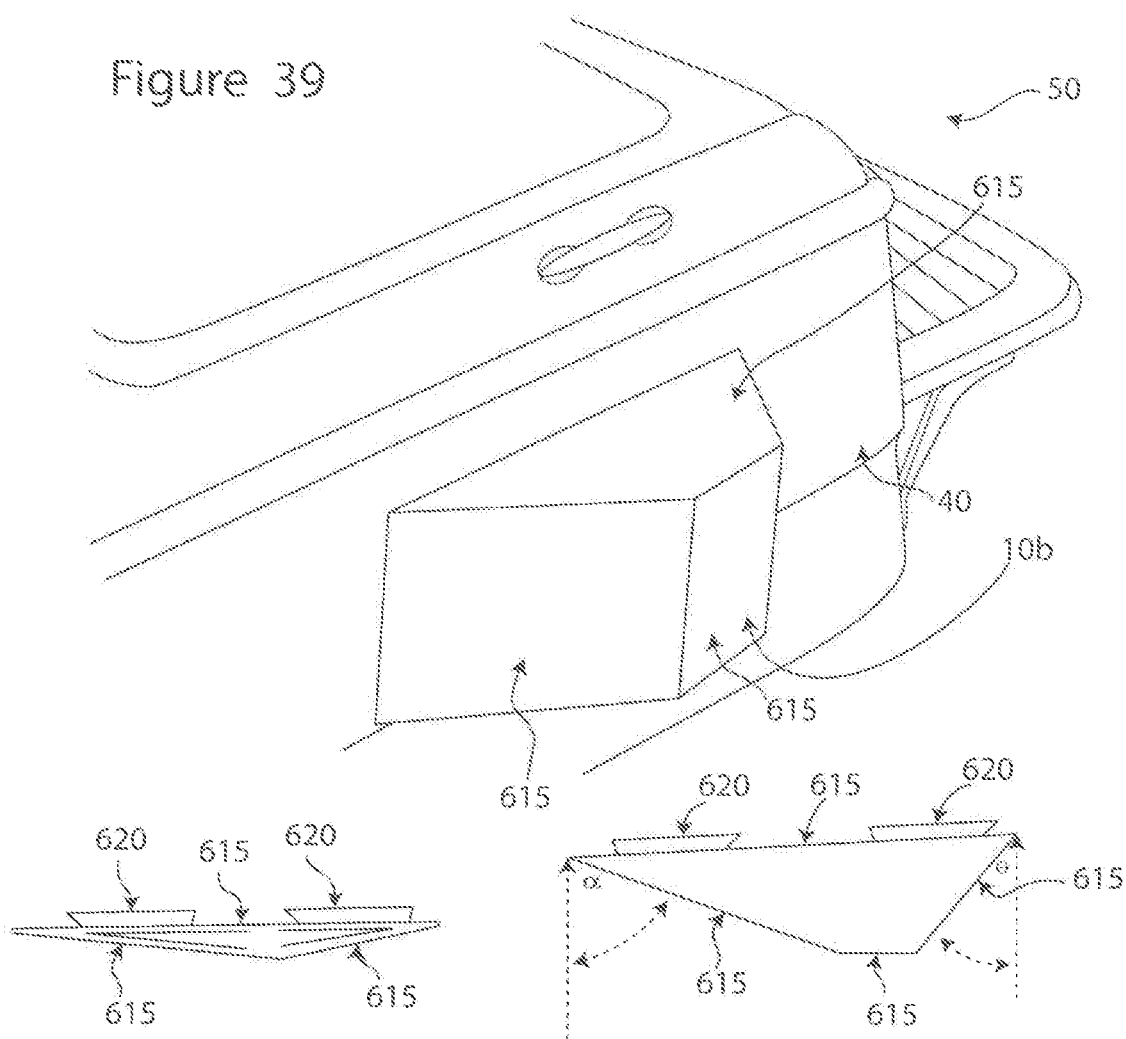

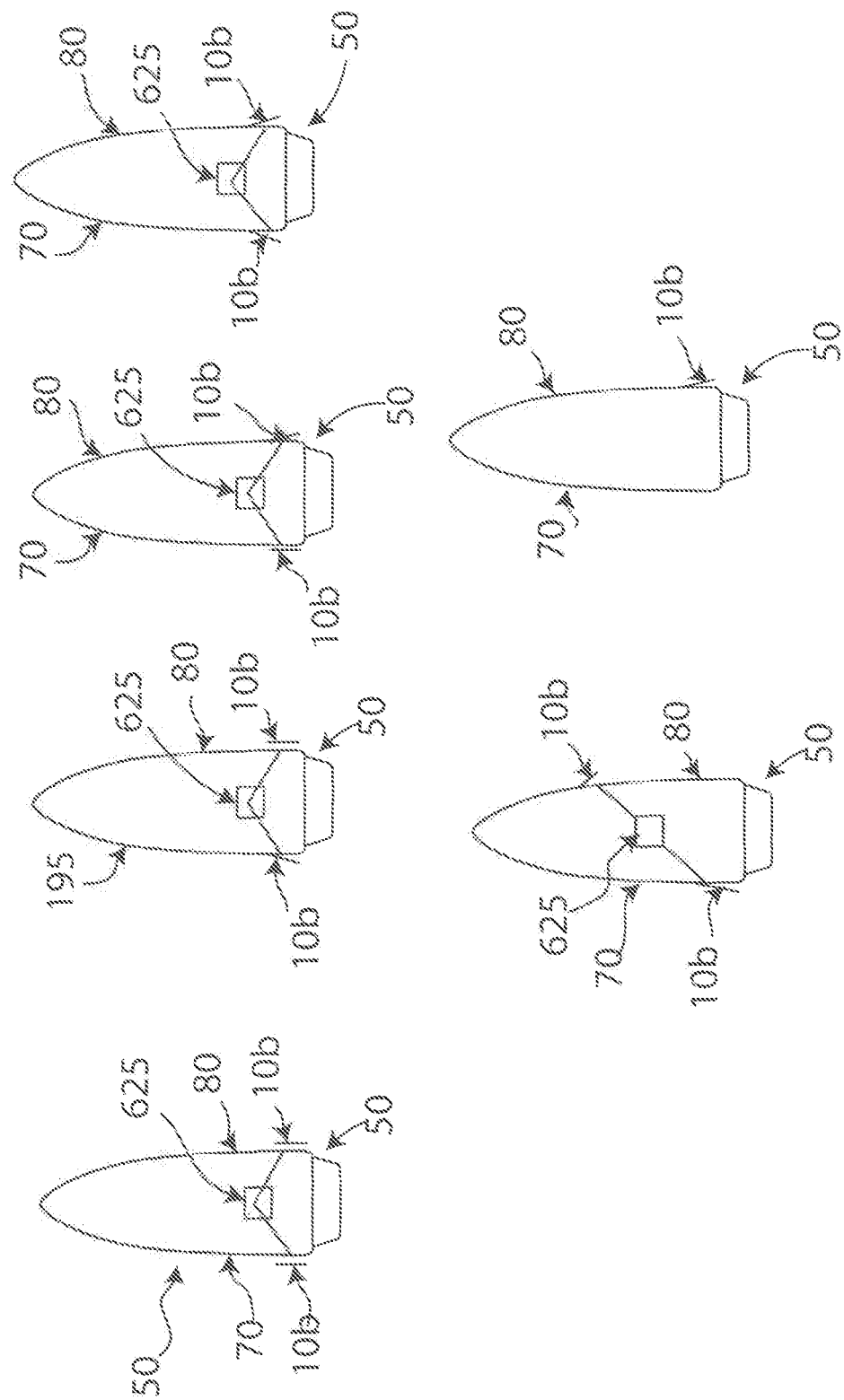

WAKE SHAPING APPARATUS AND RELATED TECHNOLOGY

CROSS-REFERENCE TO RELATED APPLICATIONS

This application is a continuation of U.S. patent application Ser. No. 15/858,779, filed Dec. 29, 2017, which claims priority to U.S. Provisional Patent Application No. 62/551,621, filed on Aug. 29, 2017, the entire contents of each of which are incorporated by reference herein.

FIELD OF THE INVENTION

The present invention relates to a wake shaping apparatus. More specifically, the present invention provides a wake shaping apparatus configured to attach removably to a hull of a boat such that a wake created behind the boat is larger, differently positioned and/or differently shaped than when the boat is operated without the apparatus. The present invention also provides a deployable lanyard assembly that can be used with the wake shaping apparatus. Further, the invention provides a splash deflector.

BACKGROUND OF THE INVENTION

When a boat moves through water, a wave pattern referred to as a wake is produced on the water surface. In some water sports, such as wake surfing, it is beneficial to modify the size, shape and/or position of a wake created behind the boat in order to enhance the wake surfing experience.

As set forth in the present disclosure, it would be desirable to provide a wake shaping apparatus that removably attaches to a hull of a boat. It would also be desirable to provide a wake shaping apparatus that overcomes the disadvantages of conventional wake shapers known in the prior art. The present invention overcomes such disadvantages, for example, by providing an apparatus that removably attaches to the hull of a boat, is easy to operate, is easily graspable, provides adjustability, and/or provides other advantages. It would also be desirable to provide a splash deflector that can be used with the wake shaping apparatus or on its own. Further, it would be desirable to provide a lanyard assembly that can be connected between the wake shaping apparatus and a boat.

SUMMARY OF THE INVENTION

Certain embodiments of the invention provide an apparatus configured to attach removably to a hull of a boat. The apparatus comprises a base and a blade and has first and second configurations. The first configuration is characterized by the blade being mounted to the base. The second configuration is characterized by the blade being separated from the base. In the present embodiments, the apparatus is configured to provide tool-free adjustment between the first and second configurations.

In some embodiments, the invention provides an apparatus having a handle configuration characterized by an aperture large enough to receive four fingers of a person's hand so as to facilitate manual handling of the apparatus. The apparatus is configured to attach removably to a hull of a boat.

Some embodiments of the invention provide an apparatus having generally opposed first and second side regions and a lanyard eyelet. The lanyard eyelet is movable between at least first and second positions. When in the first position, the lanyard eyelet is located at the first side region of the apparatus. When in the second position, the lanyard eyelet is located at the second side region of the apparatus. The apparatus is configured to attach removably to a hull of a boat.

Certain embodiments of the invention provide an apparatus having first and second configurations. The first configuration is characterized by the blade being mounted to the base. The second configuration is characterized by the blade being separated from the base. The blade has opposed first and second faces. When the apparatus is in the first configuration, the blade can be in a first orientation or a second orientation. In the first orientation, the first face of the blade faces a desired direction relative to the base. In the second orientation, the second face of the blade faces the desired direction relative to the base. The blade is equipped with a mount structure that projects outwardly from both of the first and second faces of the blade. The mount structure comprises a first detent that projects from the first face of the blade, and a second detent that projects from the second face of the blade. The first detent is configured to attach to the base of the apparatus such that the blade is retained in the first orientation. The second detent is configured to attach to the base of the apparatus such that the blade is retained in the second orientation. The apparatus is configured to attach removably to a hull of a boat.

Further, some embodiments of the invention provide a combination of a boat and a splash deflector. The boat has a hull to which the splash deflector is mounted removably and noninvasively.

Still further, certain embodiments provide an apparatus comprising an adjustable base. The adjustable base has first and second end regions. The first end region has a first suction cup, and the second end region has a second suction cup. The first end region has a pivot connection with the second end region. The apparatus is configured to attach removably to a hull of a boat.

In other embodiments, the invention provides an apparatus comprising a base and a blade. The blade projects away from the base and has a plurality of channels. The apparatus is configured to attach removably to a hull of a boat.

In still other embodiments, the invention provides an apparatus comprising a base and a blade. The blade projects away from the base and has at least first and second orientations. When in the first orientation, the blade projects away from the base at a first angle. When in the second orientation, the blade projects away from the base at a second angle. The first and second angles are different. The apparatus is configured to attach removably to a hull of a boat.

In certain other embodiments, the invention provides an apparatus configured to attach removably to a hull of a boat such that when attached to the hull, the apparatus is configured to disrupt water flow around the hull of the boat such that a wake created behind the boat during operation of the boat is larger, differently positioned, and/or differently shaped than when the boat is operated without the apparatus attached to the hull. The apparatus comprises a base, a blade and a lanyard assembly. The lanyard assembly comprises a tether portion and a float portion. The float portion comprises a float and a float line. The float line is configured to be attached to the base of the apparatus. The tether portion comprises a tether line configured to be attached to a cleat on the boat.

In still other embodiments, the invention provides a combination of a boat and a wake shaping apparatus. The boat has a hull to which the wake shaping apparatus is mounted. The wake shaping apparatus is inflatable such that the wake shaking apparatus is configured to transition between an inflated state and a non-inflated state.

BRIEF DESCRIPTION OF THE DRAWINGS

FIG. 39 shows multiple views of another embodiment of an inflatable wake shaping apparatus in both inflated and non-inflated states so as to schematically illustrate how the apparatus transitions between the two states.

FIG. 40 shows multiple views of one or more inflatable wake shaping apparatuses attached to different regions of a boat.

DESCRIPTION OF VARIOUS EMBODIMENTS

Figure 1:
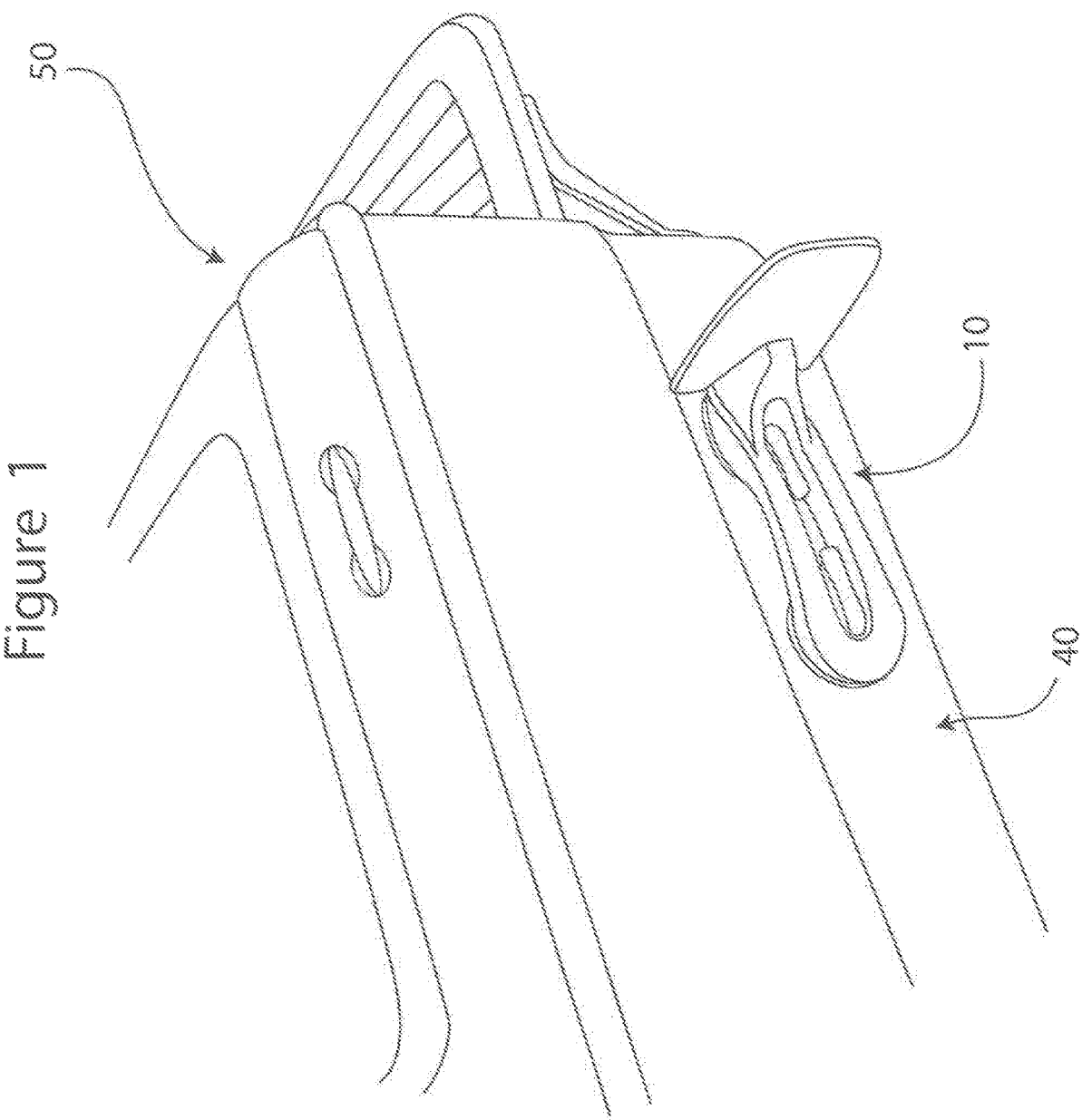
FIG. 1 is a broken-away perspective view of a wake shaping apparatus in accordance with certain embodiments of the present disclosure in which the apparatus is attached to a hull of a boat such that a front end of a base of the apparatus faces rearwardly of the boat.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Referring to the drawings, and in particular, FIG. 1, there is shown an apparatus of the present disclosure generally represented by reference numeral 10. The illustrated apparatus 10 is a wake shaping apparatus, which preferably is configured to attach removably to a hull 40 of a boat 50. The wake shaping apparatus 10 is configured to disrupt water flow around the hull 40 such that a wake created behind the boat 50 during operation of the boat 50 is larger, differently positioned, and/or differently shaped than when the boat 50 is operated without the apparatus 10 attached to the hull 40.

Figure 7:
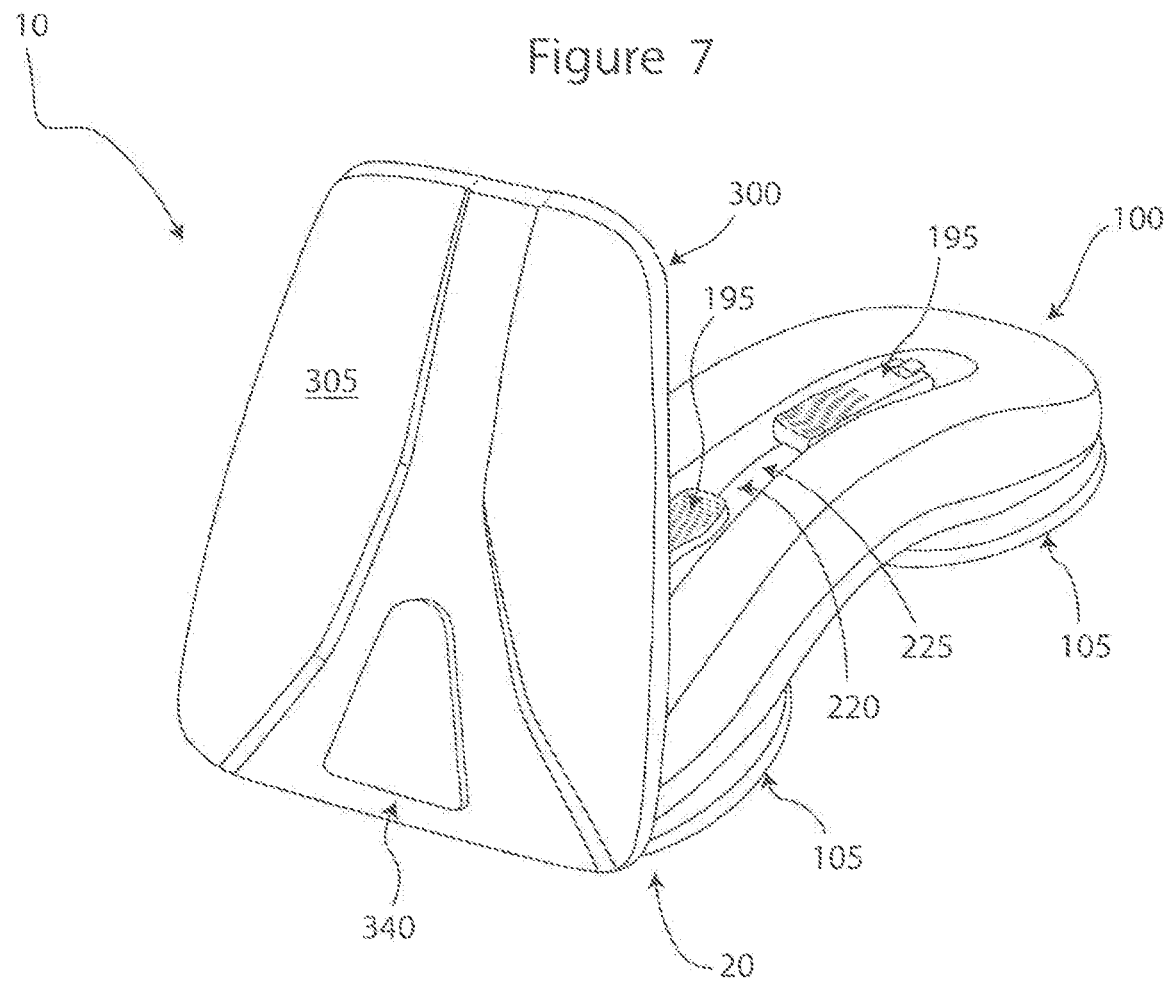
FIG. 7 is a front side perspective view of an embodiment of a wake shaping apparatus of the present disclosure in which the blade is mounted to the base.

As shown in FIG. 7, the apparatus 10 generally comprises a base 100 and a blade 300. The apparatus 10 has a first configuration 20 in which the blade 300 is mounted to the base 100, and a second configuration 30 in which the blade 300 is separated from the base 100. As described in greater detail below, in some embodiments, the apparatus 10 is configured to provide tool-free adjustment between the first 20 and second 30 configurations.

Figure 3:
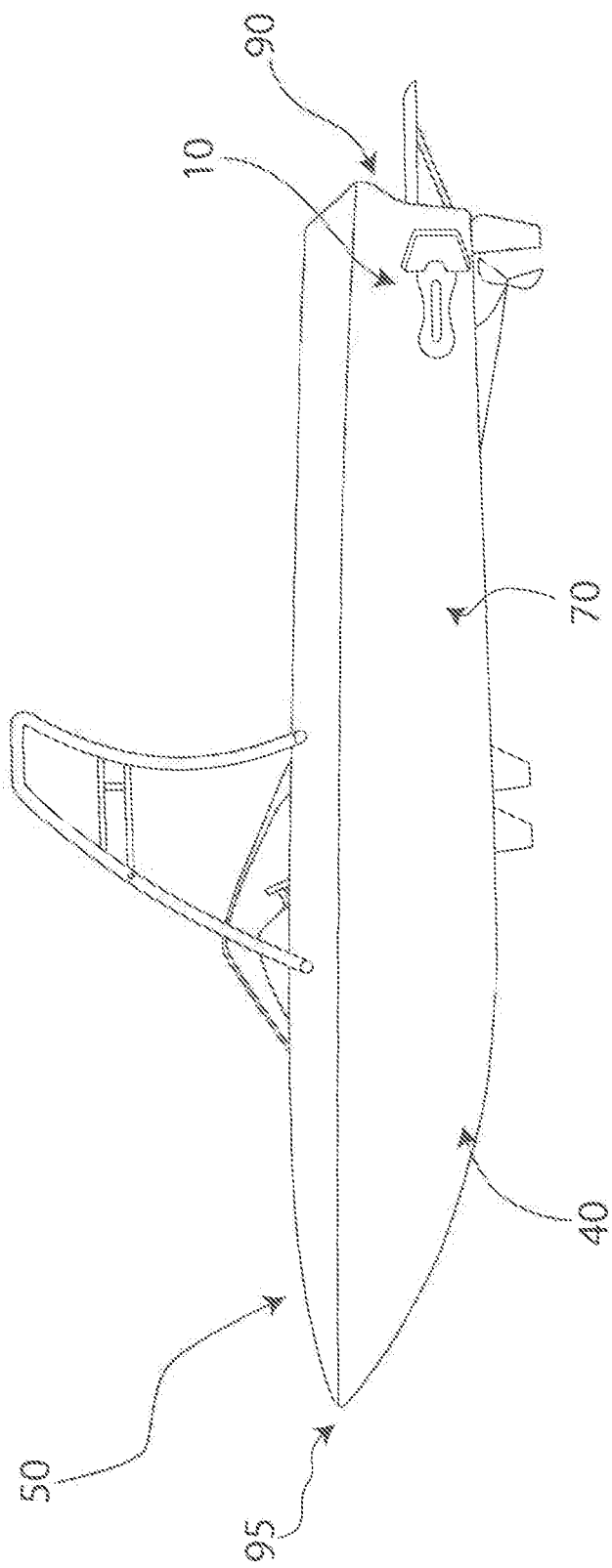
FIG. 3 is a side view of an embodiment of a wake shaping apparatus of the present disclosure attached to a hull of a boat such that a front end of a base of the apparatus faces rearwardly of the boat.

The base 100 generally has first 115 and second 120 end regions, and first 125 and second 130 side regions. The illustrated first 125 and second 130 side regions extend between the first 115 and second 120 end regions. The first end region 115 includes a front end 135 (see FIG. 3) of the base 100, and the second end region 120 includes a rear end 140 of the base 100.

Figure 16:
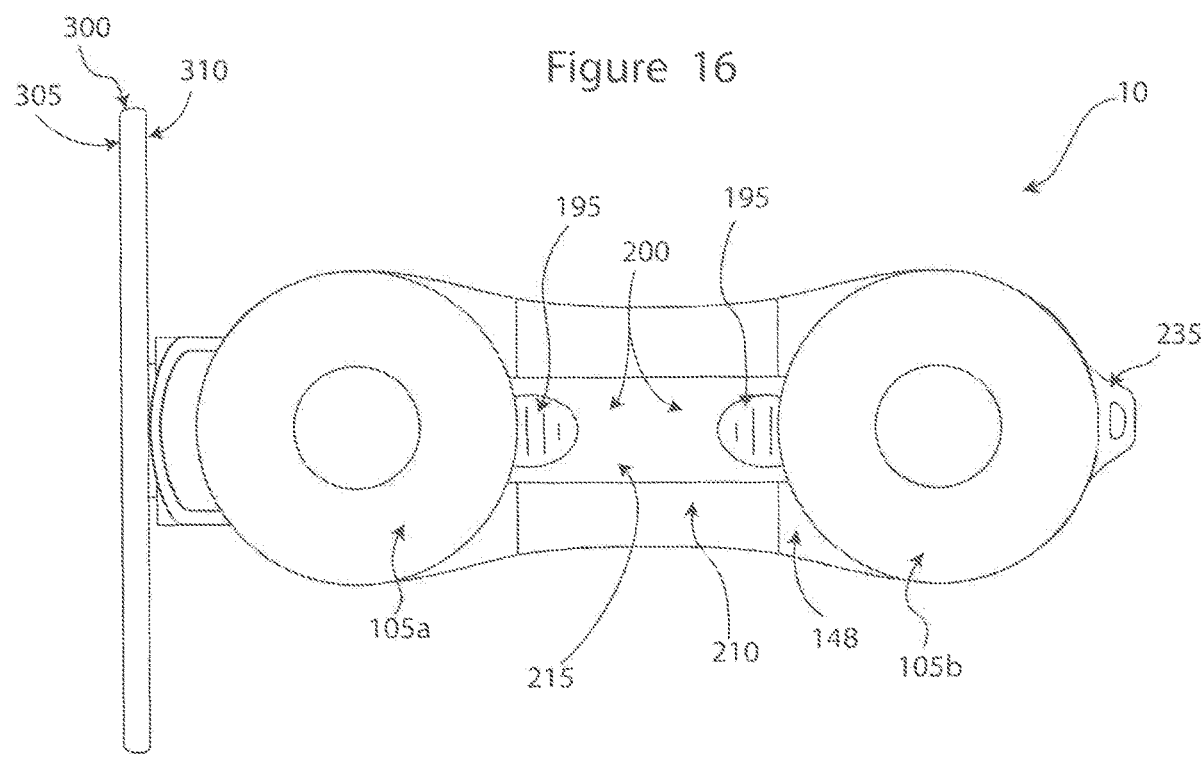
FIG. 16 is a bottom view of an embodiment of a wake shaping apparatus of the present disclosure showing two levers in a locked configuration.

The base 100 also has a top side 145 and a bottom side 148 (see FIG. 16). The top side 145 is opposite the bottom side 148. Preferably, the bottom side 148 is on the same side of the base 100 as one or more suction cups 105. When the apparatus 10 is attached to the hull 40 of a boat 50, the bottom side 148 faces (and is carried alongside) the hull 40, and the top side 145 faces away from the hull 40.

Figure 8:
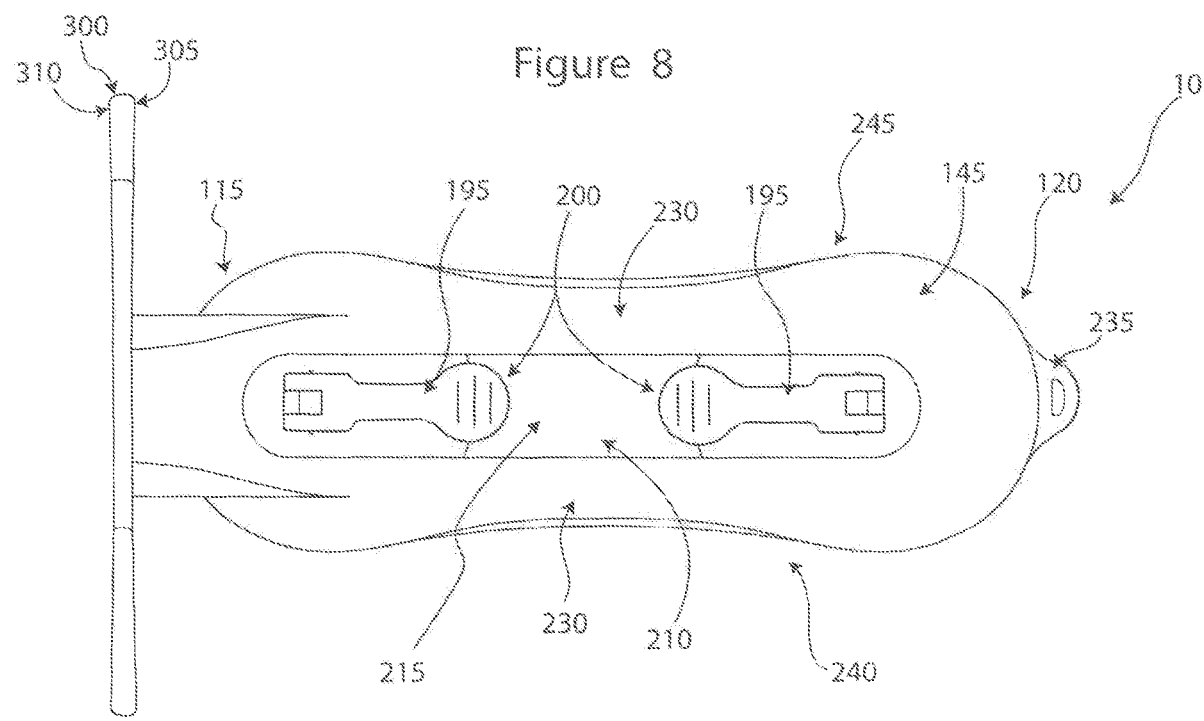
FIG. 8 is a top view of an embodiment of a wake shaping apparatus of the present disclosure.
Figure 12:
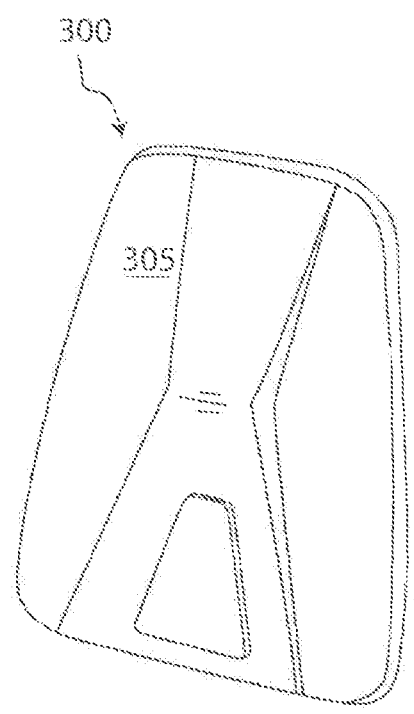
FIG. 12 is a front perspective view of an embodiment of the blade of the present disclosure showing a convex face of the blade.
Figure 13:
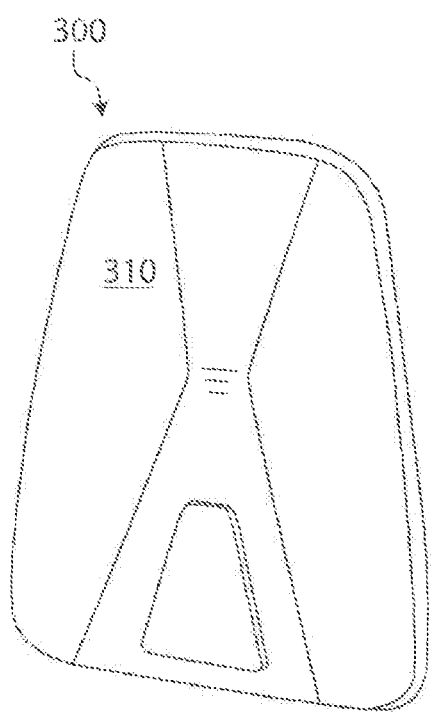
FIG. 13 is a rear perspective view of an embodiment of the blade of the present disclosure showing a concave face of the blade.

Referring to FIG. 8, the blade 300 has opposed first 305 and second 310 faces. In some embodiments, the first 305 and second faces 310 are identical, whereas in other embodiments, they are different. For example, the first face 305 of the blade 300 can have different structural features provided thereon and/or a different shape than the second face 310 of the blade 300. Such differences can optionally be provided to create different effects on the wake. In certain embodiments, one of the faces 305, 310 is convex (FIG. 12) and the other of the faces 305, 310 is concave (FIG. 13). However, in other embodiments, both faces 305, 310 of the blade 300 are planar. Alternatively, one face 305, 310 can be planar while the other face 305, 310 is either concave or convex.

As discussed above, the illustrated apparatus 10 has a first configuration 20 (see FIG. 7) in which the blade 300 is mounted to the base 100. When the apparatus 10 is in the first configuration 20, the blade 300 is in either a first orientation or a second orientation. The first face 305 of the blade 300 faces a desired direction relative to the base 300 when the apparatus 10 is in the first orientation. In contrast, the second face 310 of the blade 300 faces the desired direction relative to the base when the apparatus 10 is in the second orientation. It may be advantageous to change the blade 300 between the first orientation and the second orientation when the first 305 and second 310 faces of the blade 300 have different structures and/or shapes in order to achieve different effects on the wake.

The illustrated blade 300 has a mount structure 340 configured to attach to the base 100. The mount structure 340 preferably projects outwardly from the blade 300 (e.g., outwardly from a primary wall portion of the blade). For example, the mount structure 340 can optionally project outwardly from at least one, and preferably both, of the first 305 and second 310 faces of the blade 300. In some alternate embodiments, the base 100 is integral to (or permanently affixed to) the blade 300. However, in preferred embodiments, the base 100 and the blade 300 are configured to be attached to each other removably. Where the mount structure 340 projects outwardly from both faces 305, 310 of the blade 300, the blade 300 is configured to be removably attached to the base 100 in either of two orientations, i.e., in either the first or second orientation so that a desired one of the faces 305, 310 of the blade 300 faces the desired direction.

Preferably, the apparatus 10 is configured to be adhered to the hull 40 of the boat 50 by at least one suction cup 105 so as to removably attach the apparatus 10 to the hull 40 of the boat 50. However, the apparatus 10 can alternatively be removably attached to the hull 40 through other non-invasive forms of mechanical attachment, such as hook and loop fasteners, clasps, magnets, or the like. The removable nature of the apparatus 10 allows it to be used on a boat 50 that already has a built-in wake-shaping device so as to complement the effects provided by the built-in wake-shaping device. Alternatively, the apparatus 10 can be used on a boat 50 that does not have any other wake-shaping devices.

Figure 2:
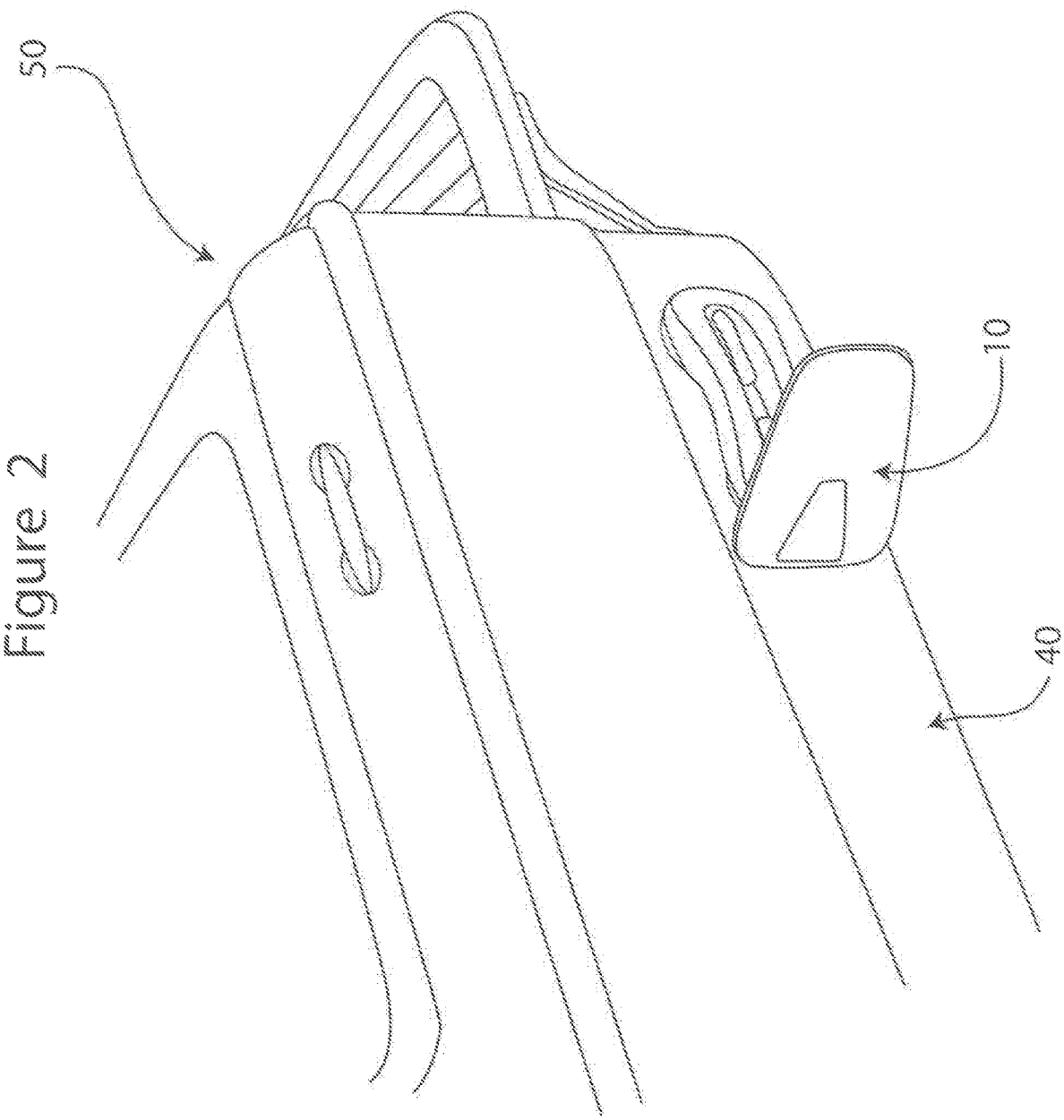
FIG. 2 is a broken-away perspective view of a wake shaping apparatus of the present disclosure similar to FIG. 1, except that the apparatus is attached to the hull of the boat such that a rear end of the base of the apparatus faces rearwardly of the boat.
Figure 4:
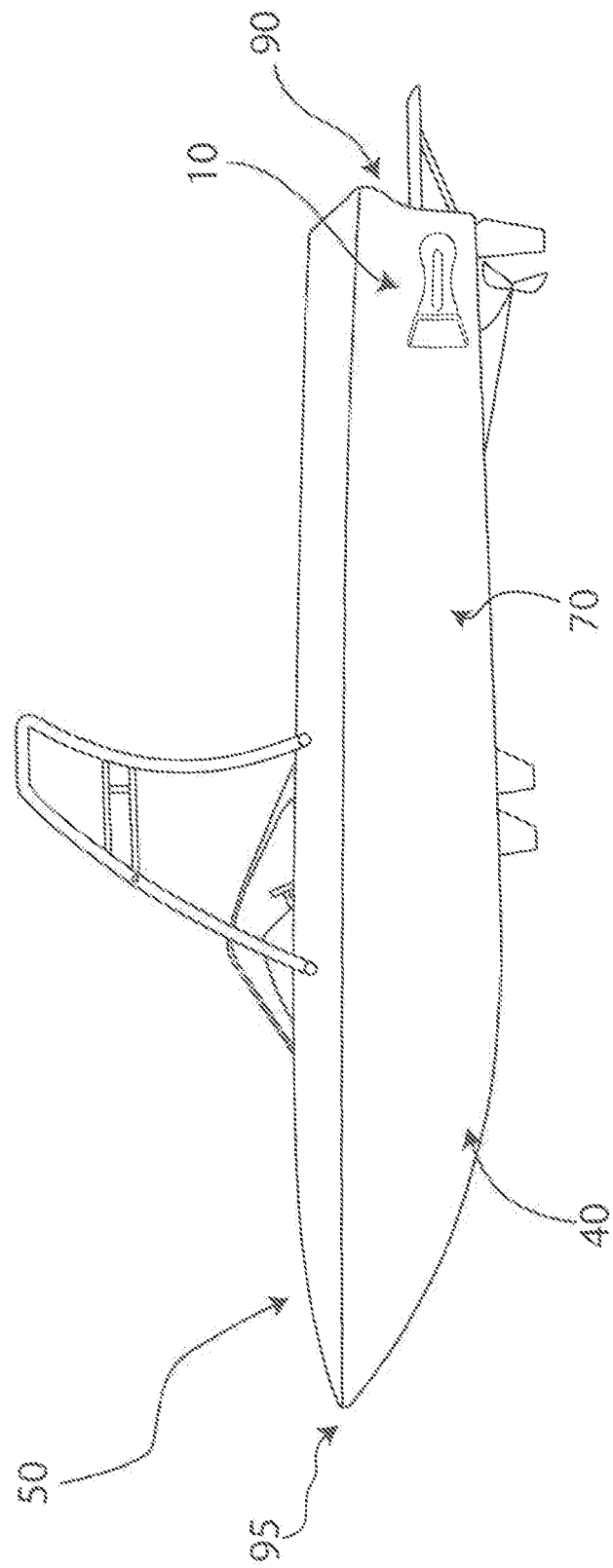
FIG. 4 is a side view of a wake shaping apparatus of the present disclosure similar to FIG. 3, except that a rear end of a base of the apparatus faces rearwardly of the boat.
Figure 5:
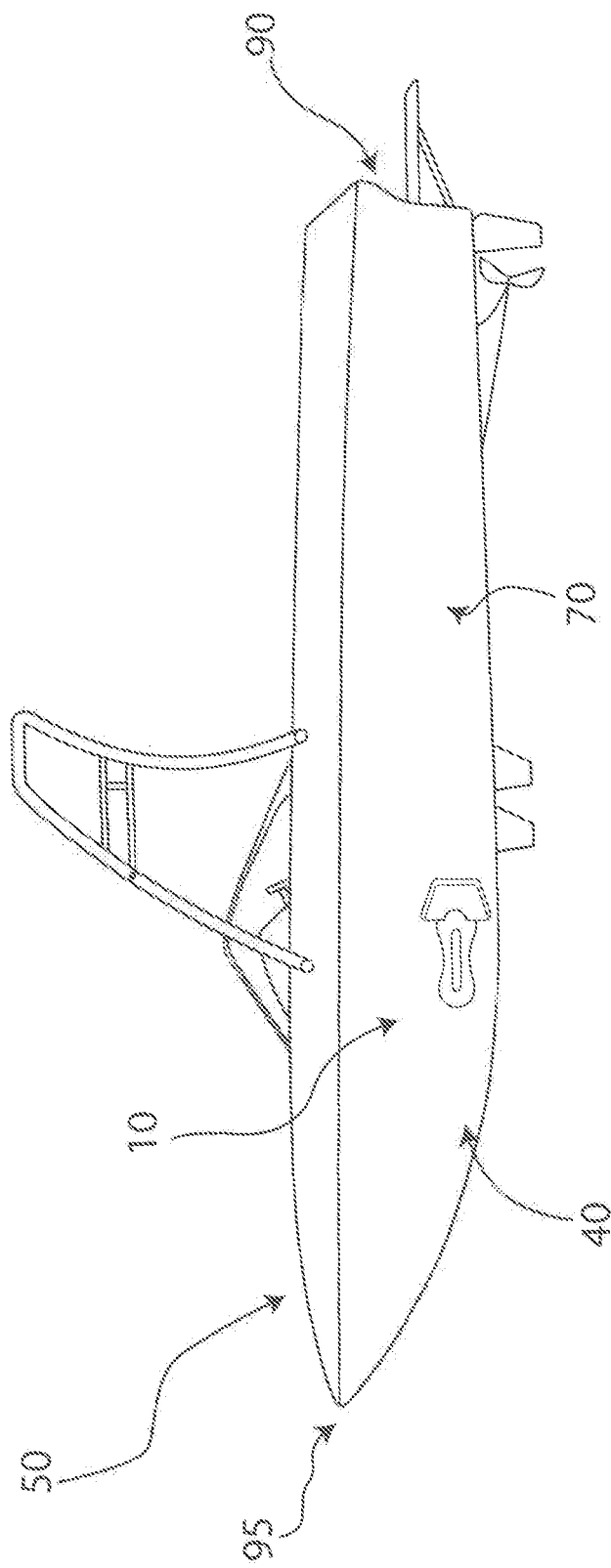
FIG. 5 is a side view of an embodiment of a wake shaping apparatus of the present disclosure attached to a hull of a boat at a position that is nearer to a bow than to a stern of the boat.

Thus, the apparatus 10 preferably can be attached removably to the boat 50 in a desired orientation and on a desired region of the boat 50. Both the orientation of the apparatus 10 when attached to the boat, and the region of the boat to which the apparatus 10 is attached, can be selected to achieve particular effects on the wake. For example, in FIGS. 1 and 3, the apparatus 10 is attached to the hull 40 of the boat 50 such that the front end 135 of the base 100 faces rearwardly of the boat 50. FIGS. 2 and 4 show the reverse orientation, i.e., the rear end 140 of the base 100 faces rearwardly of the boat 50. The apparatus 10 can be attached to the hull 40 of the boat 50 at a position that is adjacent to a stern 90 (FIGS. 1-4) or adjacent to a bow 95 (FIG. 5) of the boat 50.

Figure 6:
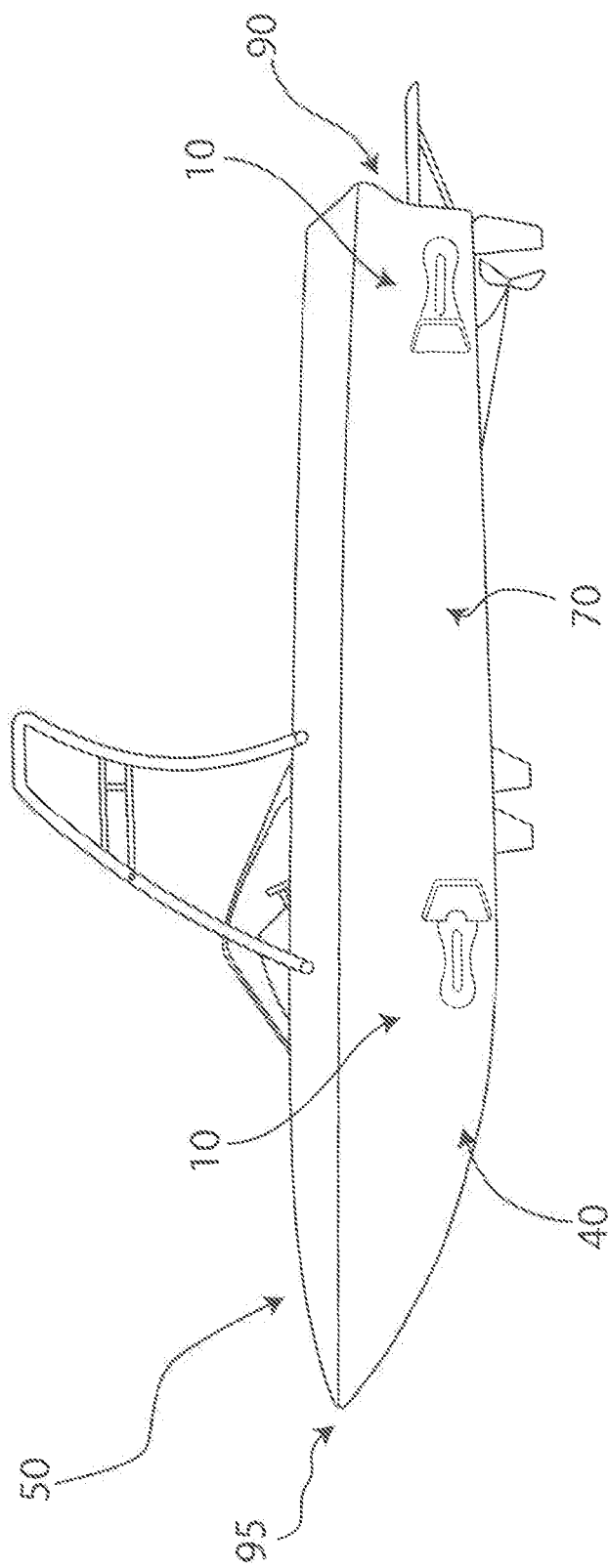
FIG. 6 is a side view of an embodiment of the present disclosure having two wake shaping apparatuses both attached to the same side of a hull of a boat such that one of the apparatuses is positioned near a bow of the boat and the other of the apparatuses is positioned near a stern of the boat.

In some embodiments, two wake shaping apparatuses 10 are each attached to the same side of a hull 40 of a boat 50. As shown in FIG. 6, one of the apparatuses 10 can be positioned adjacent to the bow 95 of the boat 50, while the other apparatus 10 is positioned adjacent to the stern 90 of the boat 50. Given the present teaching as a guide, skilled artisans will appreciate that the one or more apparatuses 10 can be mounted removably at various locations on the hull.

Tool-Free Adjustment

Figure 9:
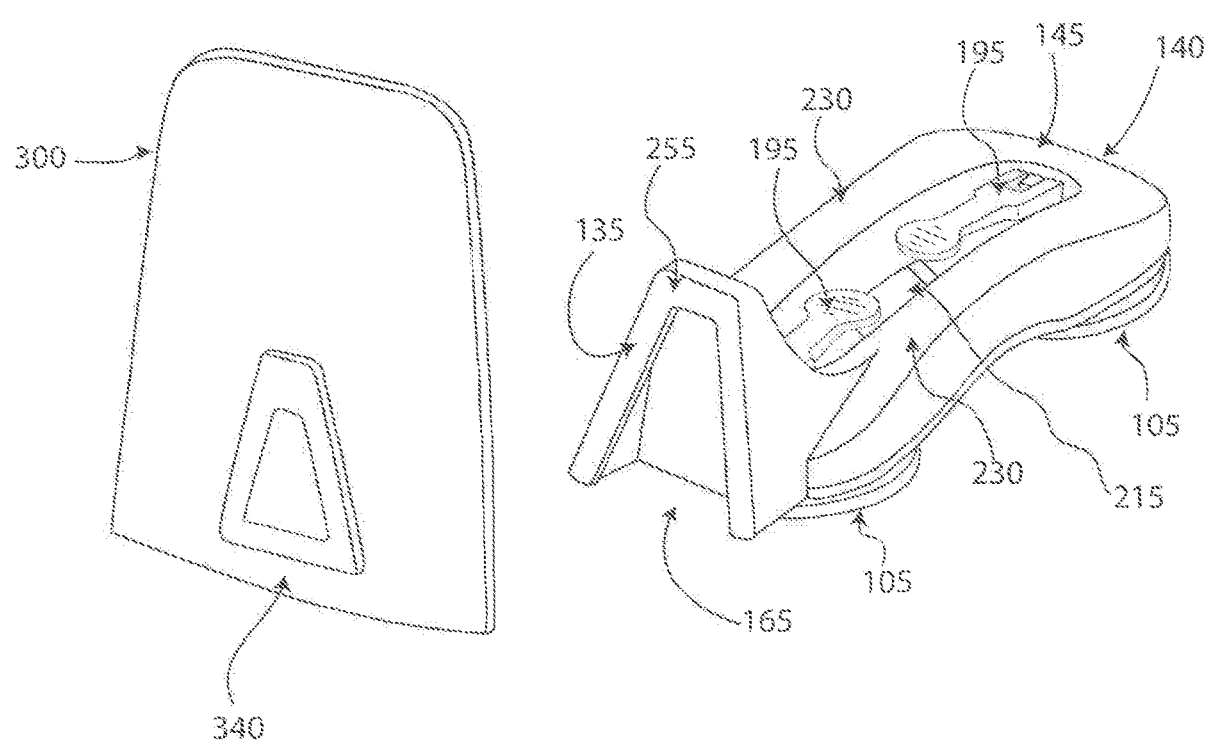
FIG. 9 is a front side perspective view of an embodiment of a wake shaping apparatus of the present disclosure in which the blade is separated from the base.

In certain embodiments, the base 100 and the blade 300 can be separated from each other to achieve the second configuration 30 described above. One example of the second configuration 30 is shown in FIG. 9. Preferably, when the apparatus 10 is in the second configuration 30, the base 100 and the blade 300 can be nested alongside each other so as to occupy a more compact (i.e., smaller) space than when the apparatus 10 is in the first configuration 40. In certain embodiments, the apparatus 10 when in the second configuration can have its blade and base nested alongside each other so as to fit within a rectangular volume (e.g., inside a box) having the following dimensions: 15 inches by 6 inches by 9 inches, or even 14 inches by 5 inches by 8 inches. While not in use, the apparatus 20 can be removed from the hull 40 of the boat 50 and stored conveniently until needed.

In some embodiments, the apparatus 10 can be adjusted from the first configuration 20 to the second configuration 30, and from the second configuration 30 to the first configuration 20, without using any tools, and preferably without removing or inserting any fastener from or into the base 100. In such cases, the blade 300 can be mounted to the base 100 and later removed therefrom without using any tools. This is particularly advantageous since the apparatus 10 is intended to be attached to the hull of a boat 50 at a location that is under water while the boat 50 is in operation. Using tools underwater can prove difficult due to visibility issues, the tendency of tools to become slippery when wet, and/or the potential for the water to be cold. These factors may lead to tools and/or fasteners being dropped into the water.

In some embodiments, an optional hook and loop fastener is sandwiched between the blade 300 and the base 100 when the apparatus 10 is in the first configuration 20. In such embodiments, the hook and loop fastener is configured to removably fasten the blade 300 to the base 100. When provided, the hook and loop fastener preferably is used in addition to the mount structure 340. However, in some embodiments, the hook and loop fastener may replace the mount structure 340 entirely.

When provided, the hook and loop fastener includes a first portion attached to the base 100 and a second portion attached to either the mount structure 340 or directly to one or both faces 305, 310 of the blade 300. Preferably, the second portion of the hook and loop fastener is attached to the mount structure 340 on both the first 305 and second 310 faces of the blade 300 so that the blade 300 can be positioned in either the first 315 or second 320 orientation as desired.

As discussed above, it is preferable that the apparatus 10 is configured to be removably attached to a hull of a boat using one or more suction cups 105. In such cases, at least one suction cup 105 on the base 100 forms part of a suction cup assembly 110. Preferably, the suction cup assembly 110 includes at least two (or has exactly two) suction cups 105. However, the suction cup assembly 110 can alternatively include only one suction cup 105, or it can include more than two suction cups 105.

Figure 10:
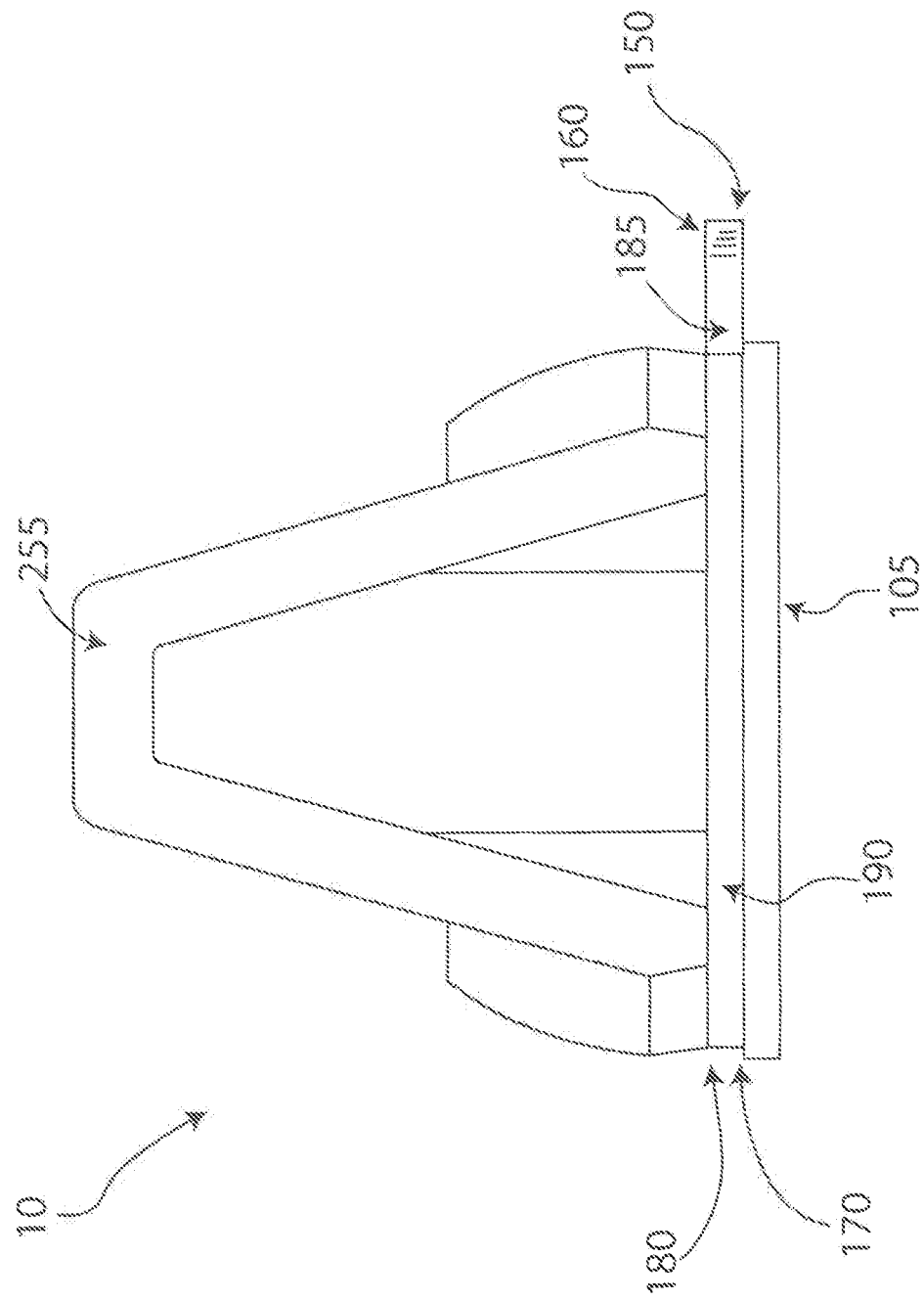
FIG. 10 is a front view of an embodiment of a wake shaping apparatus of the present disclosure in which a body is in its second position.
Figure 11:
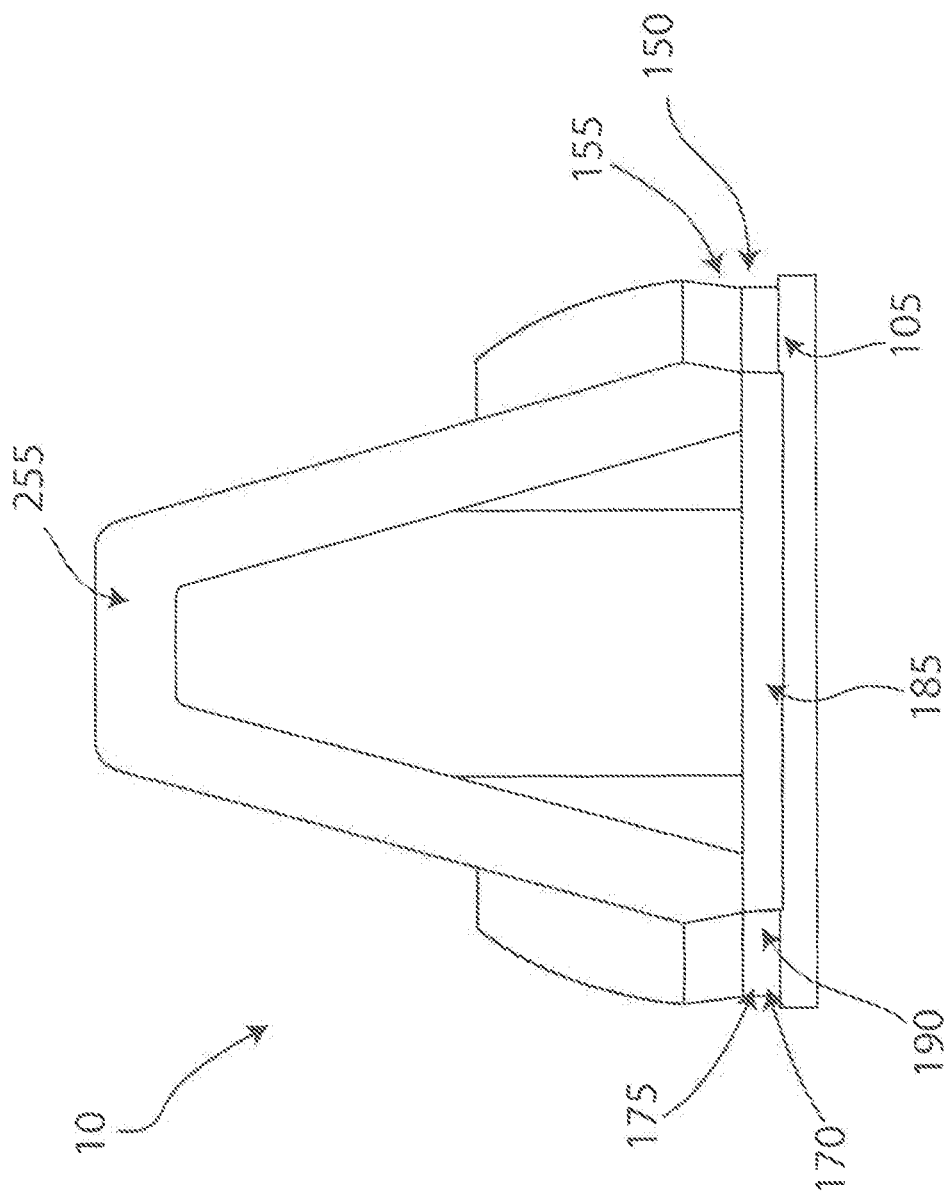
FIG. 11 is a front view of an embodiment of a wake shaping apparatus of the present disclosure in which the body is in its first position.

In preferred embodiments, the base 100 further includes a detent 150 having at least first 155 and second 160 positions. In the first position 155, the detent 150 is configured to lock the blade 300 on the base 100. In the second position 160, the detent 150 is configured to release the blade 300 from the base 100. One example of the second position 160 is shown in FIG. 10, and one example of the first position 155 is shown in FIG. 11. Preferably, the detent 150 is rotatable between its first 155 and second 160 positions. However, it should be appreciated that in some embodiments, the detent 150 is not limited to rotational movement, and can instead move linearly, for example. In some embodiments, the detent 150 is part of a suction cup assembly 110 and is located between the base 100 and a suction cup 105.

Figure 28:
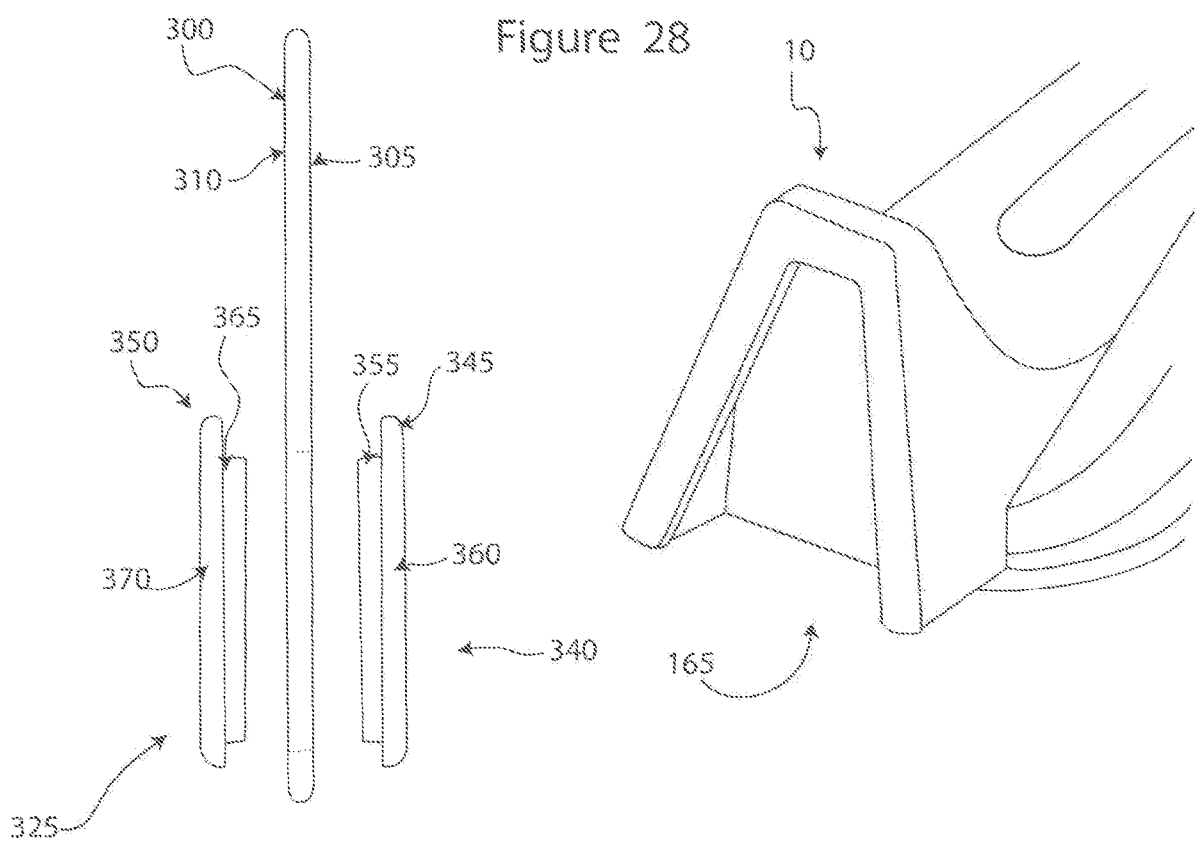
FIG. 28 is a side view of a blade, a partially exploded side view of an adapter component of the present disclosure, and a perspective view of a base showing a channel configured to selectively receive the first or second detent of the adapter component in certain embodiments of the present disclosure.

The illustrated base 100 (e.g., a shoulder thereof) has a channel 165 therein. In a preferred embodiment, the channel 165 is a slot. The illustrated blade 300, and more specifically an adapter component 325 of the illustrated blade, comprises at least one plate, and preferably two plates 355, 365, each configured to be received removably in the channel 165. The adapter component 325 and the channel 165 are shown in FIG. 28. Preferably, the two plates of the adapter component 325 include a first plate 355 disposed adjacent the first face 305 of the blade 300, and a second plate 365 disposed adjacent the second face 310 of the blade 300. The adapter component 325, however, can alternatively have only a single plate, which can be located on either the first face 305 or second face 310 of the blade 300.

The base 100, and more specifically the detent 150, can comprise a body 170 that is moveable between first 175 and second 180 positions. When in the first position 175 (see FIG. 11), the body 170 at least partially closes the channel 165 of the base 100. When in the second position 180 (see (FIG. 10), the body 170 is spaced from the channel 165 of the base 100. In a preferred embodiment, the body 170 comprises a rotatable flange 185 that is rotatable between its first 175 and second 180 positions. However, it should be appreciated that in some embodiments, the body 170 is not limited to rotational movement, and can instead move linearly, for example. The body 170 can optionally comprise a generally circular disc 190 from which the rotatable flange 185 projects. In preferred embodiments, the body 170 is part of a suction cup assembly 110 and the disc 190 is located between a suction cup 105 and the base 100.

Figure 18:
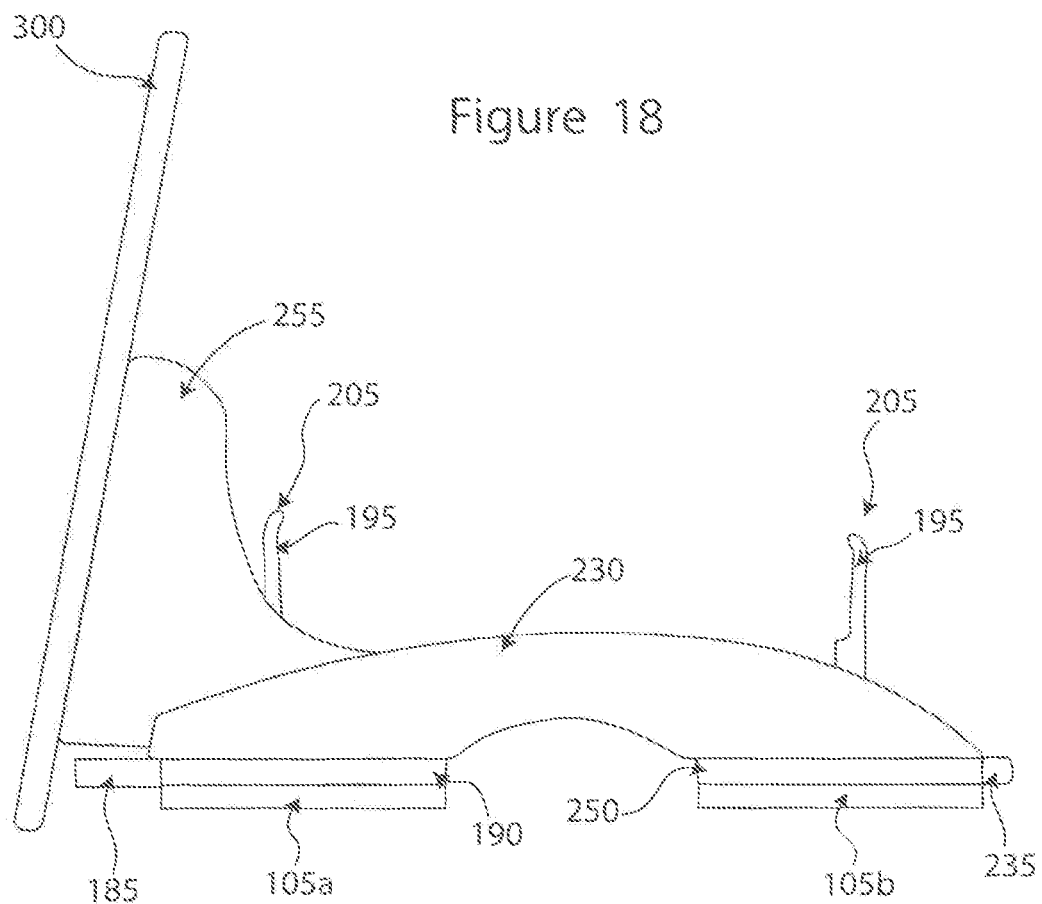
FIG. 18 is a side view of an embodiment of a wake shaping apparatus of the present disclosure in which each of two levers is in an unlocked configuration.
Figure 19:
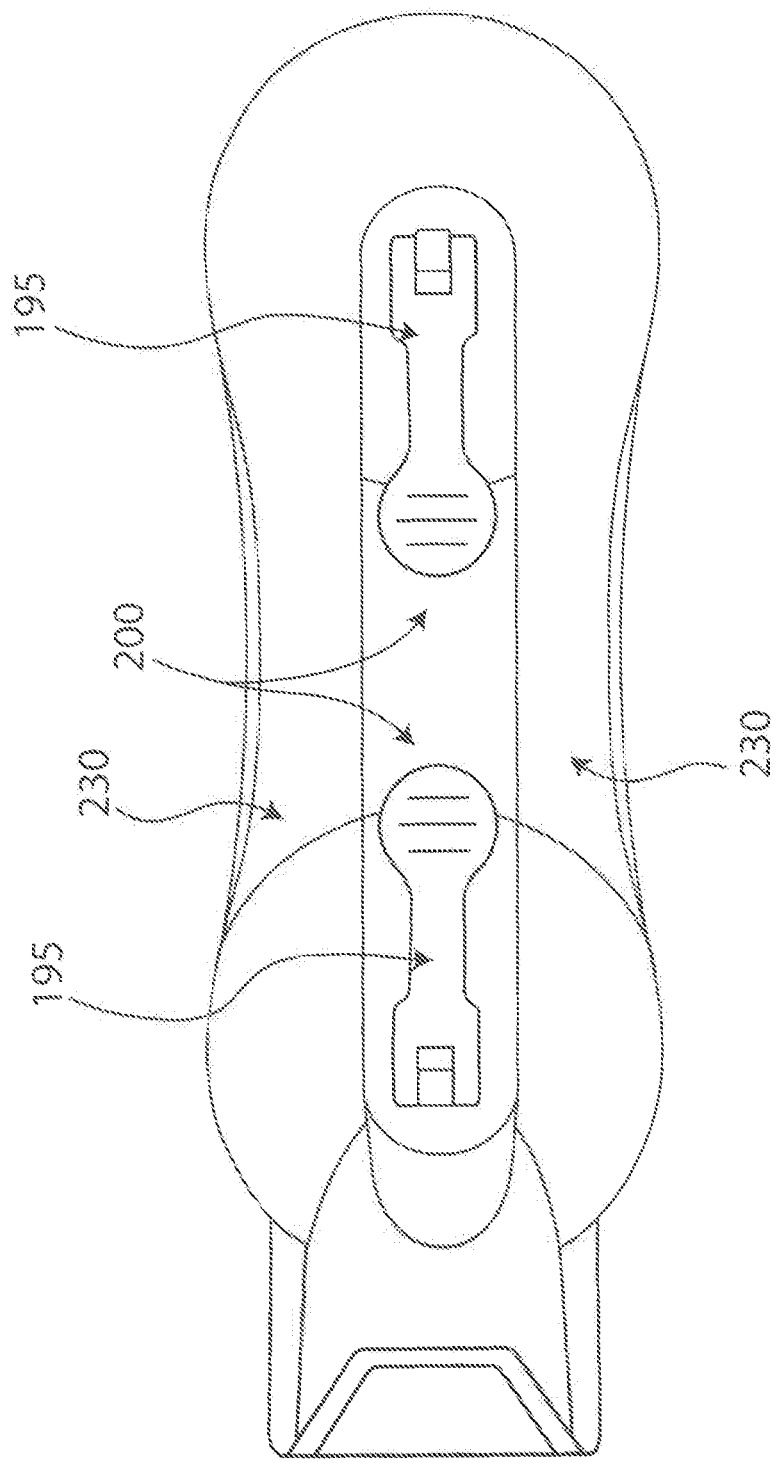
FIG. 19 is a top view of an embodiment of a wake shaping apparatus of the present disclosure.

When provided, the suction cup assembly 110 can optionally include at least one lever 195 moveable between first 200 and second 205 positions. Preferably, one lever 195 is coupled to each respective suction cup 105 so as to be operable to activate and release suction for the respective suction cup 105. However, it is possible that a single lever could be provided that simultaneously controls the suction force for all or a select group of multiple suction cups. Also, as noted above, there may be only a single suction cup on the apparatus in some cases. When the one or more levers 195 are each in the first position 200 (see, e.g., FIG. 8), each suction cup 105 is in a locked configuration. The locked configuration helps secure the respective suction cup 105 to the hull 40 of the boat 50. When the at least one lever 195 is in the second position 205 (see FIG. 18), the respective suction cup 105 is in an unlocked configuration. The unlocked configuration allows the respective suction cup 105 to be released from the hull 40 of the boat 50. Two levers 195 are each shown in a locked configuration in FIGS. 7, 8 and 19, and in an unlocked configuration in FIG. 18.

In some embodiments, two suction cups 105 are disposed in a confronting angle configuration. In such cases, the confronting angle configuration is characterized by a tilt angle (e.g., relative to horizontal and/or desired plane) of greater than zero degrees and up to three degrees. By having two suction cups 105 in such a confronting angle configuration, the suction cups 105 may adhere particularly stably to a curved surface of a hull 40 of a boat 50.

It is to be appreciated that tool-free adjustment need not be provided in all embodiments of the invention. However, any embodiment of the present disclosure can optionally be provided with tool-free adjustment of the nature described above.

Handle Configuration

In some embodiments, the apparatus 10 has a handle configuration 210 characterized by an aperture 215 in the apparatus 10. Preferably, the aperture 215 is in the base 100, as shown in FIG. 16. The aperture 215 is sized to facilitate manual handling and grasping of the apparatus 10. In a preferred embodiment, the aperture 215 is large enough (e.g., is configured) to receive four fingers of a person's hand. Preferably, the aperture 215 is elongated and/or has a generally rectangular or generally oval shape. However, it is contemplated that the aperture 215 can have any shape as long as it does not interfere with the aperture's intended purpose. In certain embodiments, the aperture has a length of at least two inches, or at least three inches, such as between three inches and six inches.

In a preferred embodiment, the aperture 215 has an aspect ratio of greater than two. As used in the present disclosure, the aspect ratio is defined as a length of the aperture 215 divided by a width of the aperture 215. The length of the aperture 215 is measured along an axis extending between the front end 135 and the rear end 140 of the base 100. The width of the aperture 215 is measured along an axis extending between the first 115 and second 120 side regions of the base 100.

The base 100 preferably has two ribs 230 that extend between (optionally entirely between) the front end 135 and rear end 140 of the base 100. In preferred embodiments, the aperture 215 is located (e.g., defined) between the ribs 230. Preferably, both of the ribs 230 are defined by a single integral body. However, in other embodiments, the ribs 230 can be separate and distinct structures from each other. Each rib 230 preferably is elongated, e.g., so as to have a length longer than six inches, such as between six and 14 inches.

As discussed above, the base 100 has a top side 145 and a bottom side 148. Preferably, the aperture 215 passes entirely through the base 100 from its bottom side 148 to its top side 145. However, in other embodiments, the aperture 215 is a blind opening such that the aperture 215 passes only partially between the bottom side 148 and the top side 145 of the base 100 (e.g., so as to have a closed bottom).

As also discussed above, in some embodiments, the suction cup assembly 110 includes two levers 195, each of which is associated with a respective suction cup 105. Such levers 195 can advantageously be disposed in a recessed area 220 (see FIG. 7) of the base 100. The recessed area 220 can, for example, define a channel 225 that extends between two ribs 230 of the base 100 and is open to aperture 215. Both of the illustrated levers 195 are aligned with the aperture 215 when in their first (locked) positions 200. Preferably, the levers 195 do not hinder (or at least do not prevent) manual access to the aperture 215. Additionally, when in the first position 200, the levers 195 can optionally be located entirely within the recessed area 220, e.g., so that the levers 195 are sheltered from being inadvertently moved to the second position 205 and thus unlocked.

It is to be appreciated that the handle configuration need not be provided in all embodiments of the invention. However, any embodiment of the present disclosure can optionally be so configured.

Lanyard Eyelet

The apparatus 10 preferably has a lanyard eyelet 235. In such cases, in order to tie the apparatus 10 to a boat 50, a tether 500 can be removably attached to both the boat 50 and the lanyard eyelet 235. The tether 500 can comprise a rope, bungee cord or the like.

Figure 14:
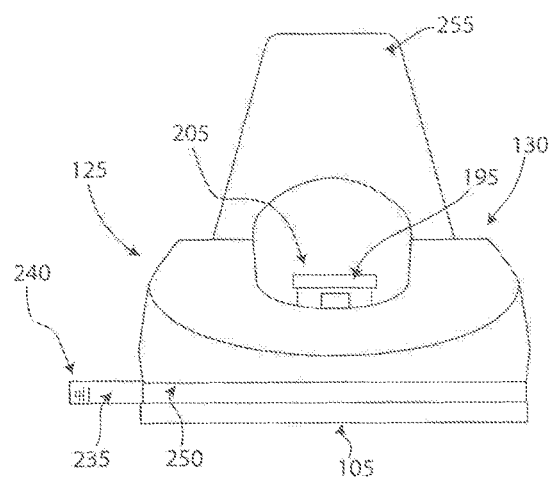
FIG. 14 is a rear view of an embodiment of a wake shaping apparatus of the present disclosure in which a lanyard eyelet is in the first position.
Figure 15:
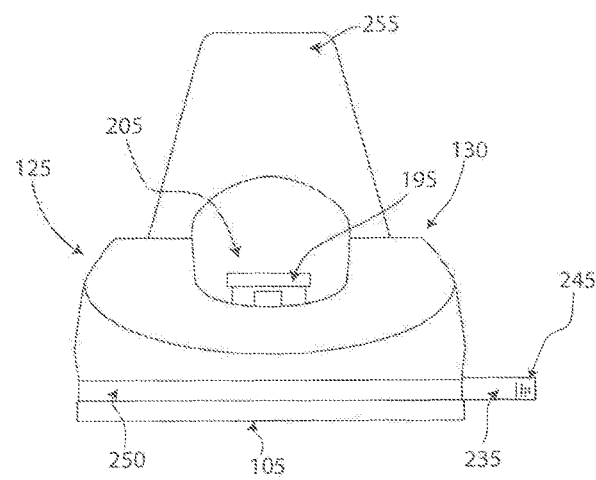
FIG. 15 is a rear view of an embodiment of a wake shaping apparatus of the present disclosure in which the lanyard eyelet is in the second position.

When provided, the lanyard eyelet 235 preferably is movable between at least first 240 and second 245 positions. When in the first position 240, the lanyard eyelet 235 is located at the first side region 125 of the apparatus 10. When in the second position 245, the lanyard eyelet 235 is located at the second side region 130 of the apparatus 10. FIG. 14 shows the lanyard eyelet 235 in the first position 240, and FIG. 15 shows the lanyard eyelet 235 in the second position 245. Providing for such movement of the lanyard eyelet 235 is advantageous since it can be positioned as needed for convenient attachment thereto by a tether 500. For example, when the front end 135 of the base 100 faces rearwardly of the boat 50, the lanyard eyelet 235 can be moved to the first position 240, and thus, to the first side region 125 of the base 100. On the other hand, when the rear end 140 of the base 100 faces rearwardly of the boat 50, the lanyard eyelet 235 can be moved to the second position 245, and thus, to the second side region 130 of the base 100. This may make it possible to use a shorter length of tether, which may be advantageous. It can also help keep the tether up out of the water flow path along the wake shaping apparatus.

Preferably, the apparatus 10 includes a suction cup assembly 110 comprising a disc 250 that is rotatable between first 240 and second 245 positions (see FIGS. 14 and 15). In preferred embodiments of this nature, the lanyard eyelet 235 can optionally be part of the suction cup assembly 110 and may be located between a suction cup 105 and the base 100. In such cases, the lanyard eyelet 235 preferably is a projection of the rotatable disc 250.

In another embodiment, the suction cup assembly 10 does not include rotatable disc 250. In this embodiment, the lanyard eyelet 235 can be fixedly or removably attached to any portion of the apparatus 10.

In embodiments where the apparatus 10 includes a suction cup assembly 110 having two suction cups 105, the rotatable disc 250 and a generally circular disc 190 can each be positioned in a stacked orientation and located between a respective suction cup 105 and the base 100. Alternatively, in another embodiment having only a single suction cup 105, rotatable disc 250 can be omitted, while a generally circular disc 190 is positioned between the single suction cup 105 and the base 100.

Figure 17:
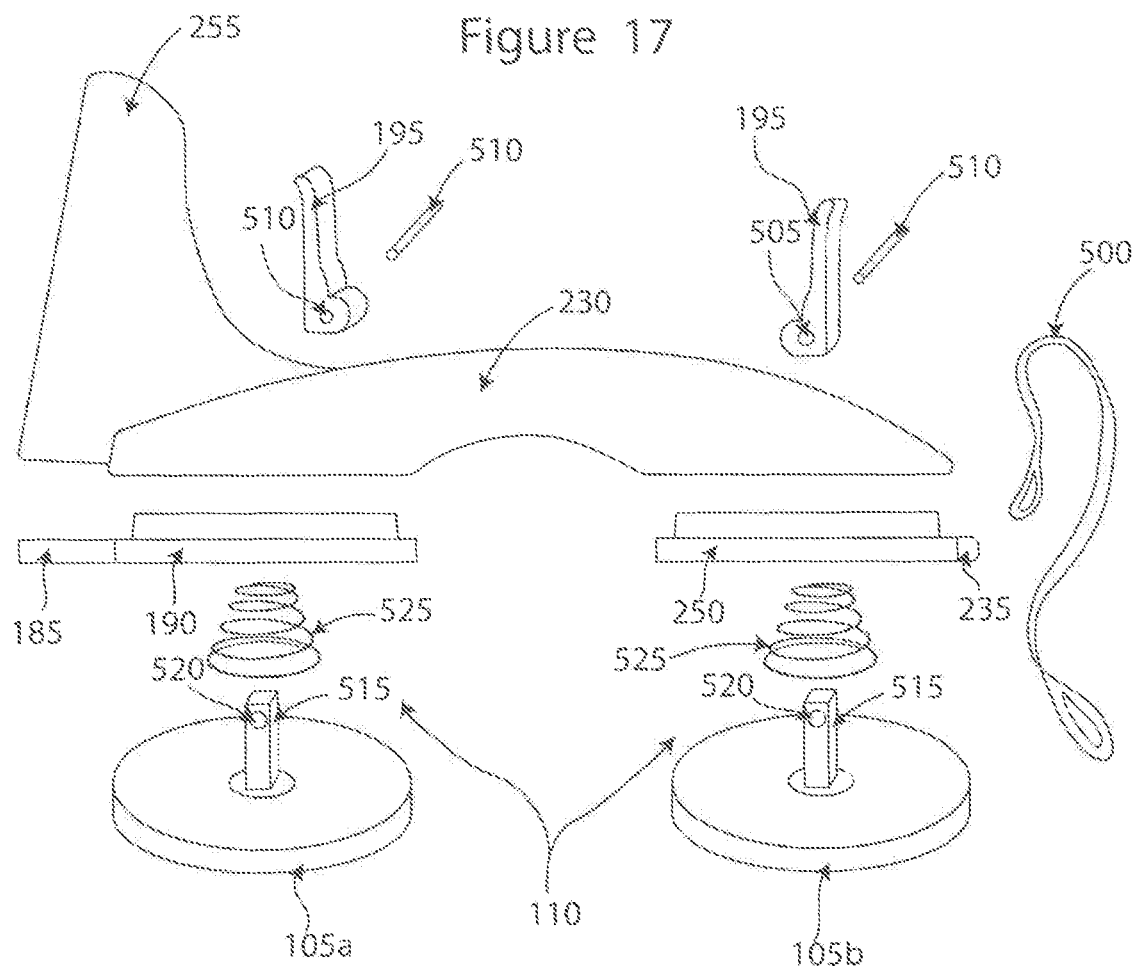
FIG. 17 is a partially exploded view of an embodiment of a wake shaping apparatus of the present disclosure showing individual components of two suction cup assemblies.

A detailed view of one example of a suction cup assembly 110 is shown in FIG. 17. Here, each lever 195 of the suction cup assembly 110 has a hole 505 disposed therein. A pin 510 is provided for each lever 195 such that one of the pins 510 can be received in the hole 505 of the respective lever 195. Each suction cup 105 further has a post 515 attached thereto and extending outwardly therefrom. Each post 515 has a hole 520 disposed therein. In addition to passing through the hole 505 of the respective lever 195, each pin 510 also passes through the hole 520 of the post 515 of the respective suction cup 105. Additional holes (not shown) are provided in the base 100, disc 190, and disc 250 to allow the levers 195 to attach to the respective suction cups 105. The suction cup assembly 110 also includes springs 525, optionally such that one spring 525 is provided for each lever 195. The springs 525 are located between the levers 195 and their respective suction cups 105.

It is to be appreciated that the lanyard eyelet need not be provided in all embodiments of the invention. However, any embodiment of the present disclosure can optionally be provided with an adjustable lanyard eyelet of the nature described above.

Mount Structure

As discussed above, the apparatus 10 preferably has different configurations depending on whether the base 100 is mounted to the blade 300 (first configuration 20) or separated from the blade 300 (second configuration 30). Additionally, when the apparatus 10 is in the first configuration 20, the blade 300 preferably is in either a first orientation or a second orientation, depending on which face 305, 310 of the blade 300 faces the desired direction relative to the base 100.

As also discussed above, the blade 300 can advantageously be equipped with a mount structure 340 that projects outwardly from at least one, and preferably both, faces 305, 310 of the blade 300. In some embodiments, the mount structure 340 comprises a first detent 345 that projects from the first face 305 of the blade 300, and a second detent 350 that projects from the second face 310 of the blade 300. The first detent 345 is configured to attach to the base 100 of the apparatus 10 such that the blade 300 is retained in the first orientation 315. The second detent 350 is configured to attach to the base 100 of the apparatus 10 such that the blade 300 is retained in the second orientation 320.

In certain embodiments, the first 345 and second 350 detents are fixed in place on (i.e., so as not to be movable relative to) the blade 300. In other embodiments, however, the first 345 and second 350 detents are part of an adapter component 325 that is moveable (e.g., relative to a primary wall of the blade 300) between at least first 330 second 335 positions. In the first position 330, the adapter component 325 is configured to attach to the base 100 of the apparatus 10 such that the blade 300 is retained in the first orientation 315. In the second position 335, the adapter component 325 is configured to attach to the base 100 of the apparatus 10 such that the blade 300 is retained in the second orientation 320.

In some embodiments, the blade 300 is configured to lie at least generally in a plane (e.g., has a configuration that is at least generally planar), and the adapter component 325 is configured to move at least generally perpendicular to such plane when the adapter component 325 moves between its first 330 and second 335 positions. The adapter component 325 can also move to an intermediate position 338 that is in-between the first 330 and second 335 positions. The first 345 and second 350 detents can optionally be connected together by conventional fasteners, such as nuts and bolts. Such fasteners can allow the first 345 and second 350 detents to slide between the first 330 and second 335 positions.

Figure 29:
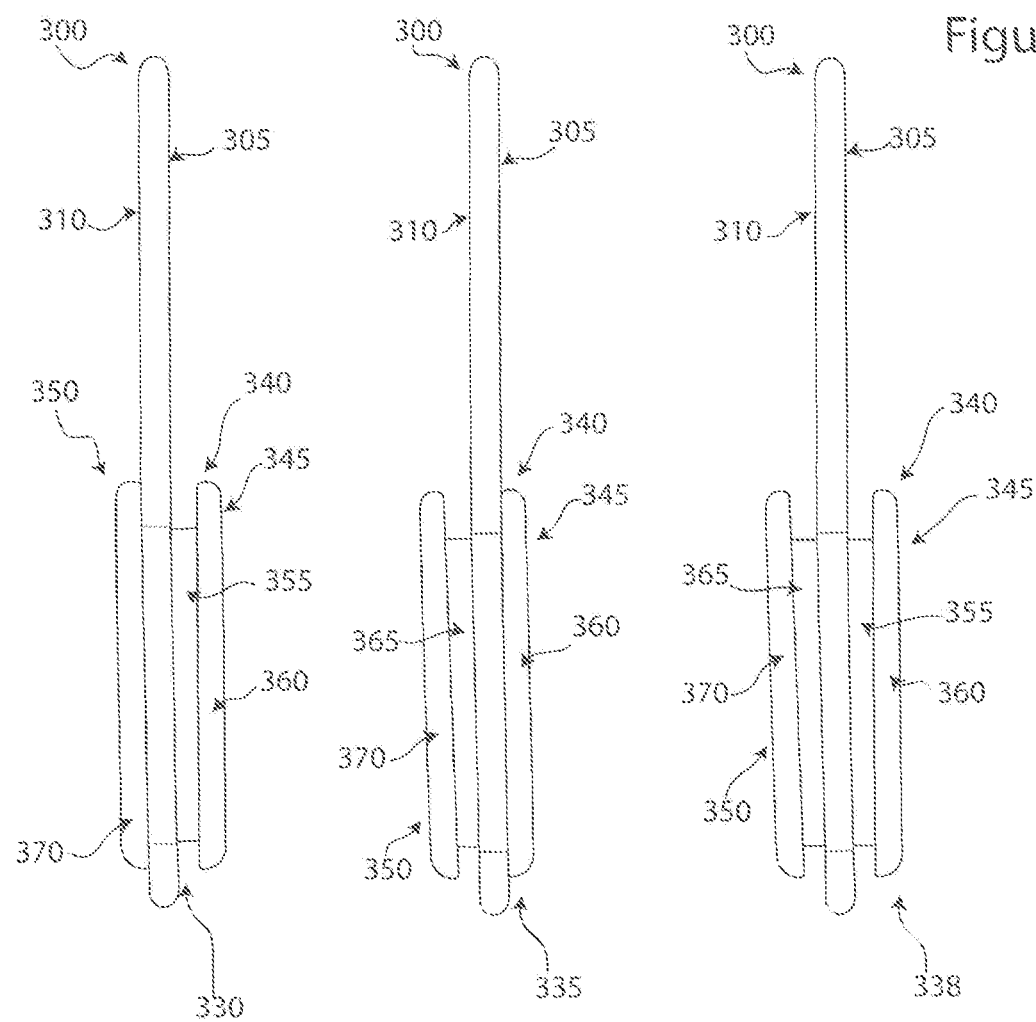
FIG. 29 is a side view of an embodiment of the adapter component of the present disclosure showing the adapter component in each of first, second, and third positions.

As shown in FIG. 29, when the adapter component 325 is in the first position 330, the first detent 345 projects further from the first face 305 of the blade 300 than it does when the adapter component 325 is in the second position 335. Likewise, when the adapter component 325 is in the second position 335, the second detent 350 projects further from the second face 310 of the blade 300 than it does when the adapter component 325 is in the first position 330. FIG. 29 shows the adapter component 325 in the first position 330 (image on the left), the second position 335 (middle image), and the intermediate position 338 (image on the right).

The first detent 345 of the adapter component 325 can optionally comprise a first plate 355 having a first mounting flange 360. Similarly, the second detent 350 of the adapter component 325 can optionally comprise a second plate 365 having a second mounting flange 370. Preferably, the first 355 and second 365 plates are moveable conjointly relative to the first 305 and second 310 faces of the blade 300. When the blade 300 is positioned in the first orientation 315, the first mounting flange 360 is received in the channel 165. When the blade 300 is positioned in the second orientation 320, the second mounting flange 370 is received in the channel 165.

As discussed above, the base 100 has opposed first 115 and second 120 end regions. The first end region 115 (e.g., a shoulder 255 thereof) defines the channel 165. In a preferred embodiment, the first end region 115 has a greater height than the second end region 120. Alternatively, in some embodiments, the first and second end regions can be identical in height, or the second end region can have a taller height than the first end region so long as the second end region includes the channel.

It is to be appreciated that the preferred blade mount structure need not be provided in all embodiments of the invention. However, any embodiment of the present disclosure can optionally be provided with a blade mount structure of the nature described above.

Adjustable Base

In certain embodiments, the base 100 is an adjustable base 100a. In some embodiments of this nature, the first end region 115 of the adjustable base 100a has a first suction cup 105a, and the second end region 120 of the adjustable base 100a has a second suction cup 105b. To make such a base adjustable, the first end region 115 can optionally have a pivot connection 260 with the second end region 120. In some cases, the pivot connection 260 allows the suction cups 105a, 105b to be oriented at various angles relative to each other. In this manner, the pivot connection 260 may permit the suction cups 105a, 105b to be stably mounted to surfaces of different contours, including both flat and curved surfaces. For example, the suction cups 105a, 105b may be configured to be positioned in a confronting angle configuration such that the suction cups 105a, 105b are angled somewhat inwardly toward each other.

Figure 20:
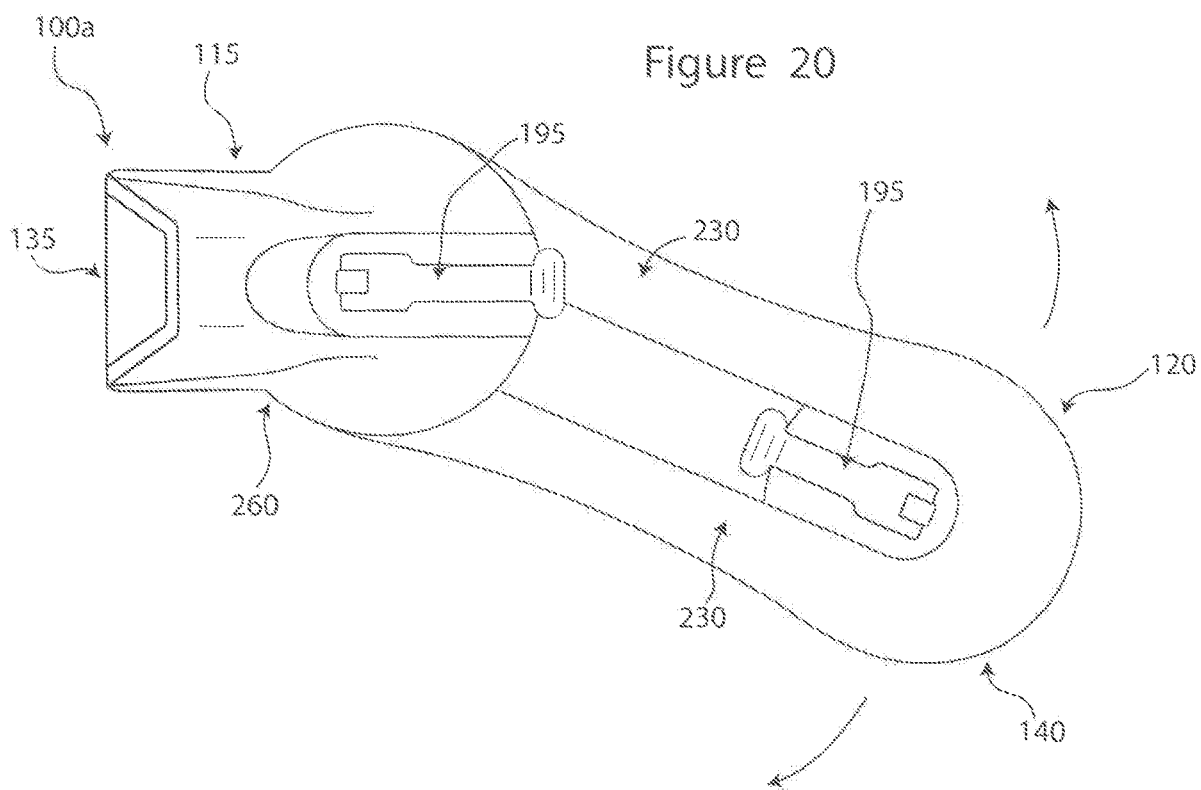
FIG. 20 is a top view of an embodiment of the present disclosure having an adjustable base that includes a pivot joint.

When provided, the pivot connection 260 preferably comprises a first pivot joint having a first pivot axis. In FIG. 20, the first pivot joint enables adjusting an angular orientation of the second end region 120 relative to that of the first end region 115 such that the apparatus 10 has at least first and second angular configurations. The first angular configuration is characterized by the first and second end regions extending along a straight line (see FIG. 19). The second angular configuration is characterized by one of the first 115 and second 120 end regions projecting away from the other at a positive acute angle (see FIG. 20). In this embodiment, both the first 105a and second 105b suction cups can remain in a constant plane while the apparatus 10 is moved between its first and second angular configurations.

Figure 21:
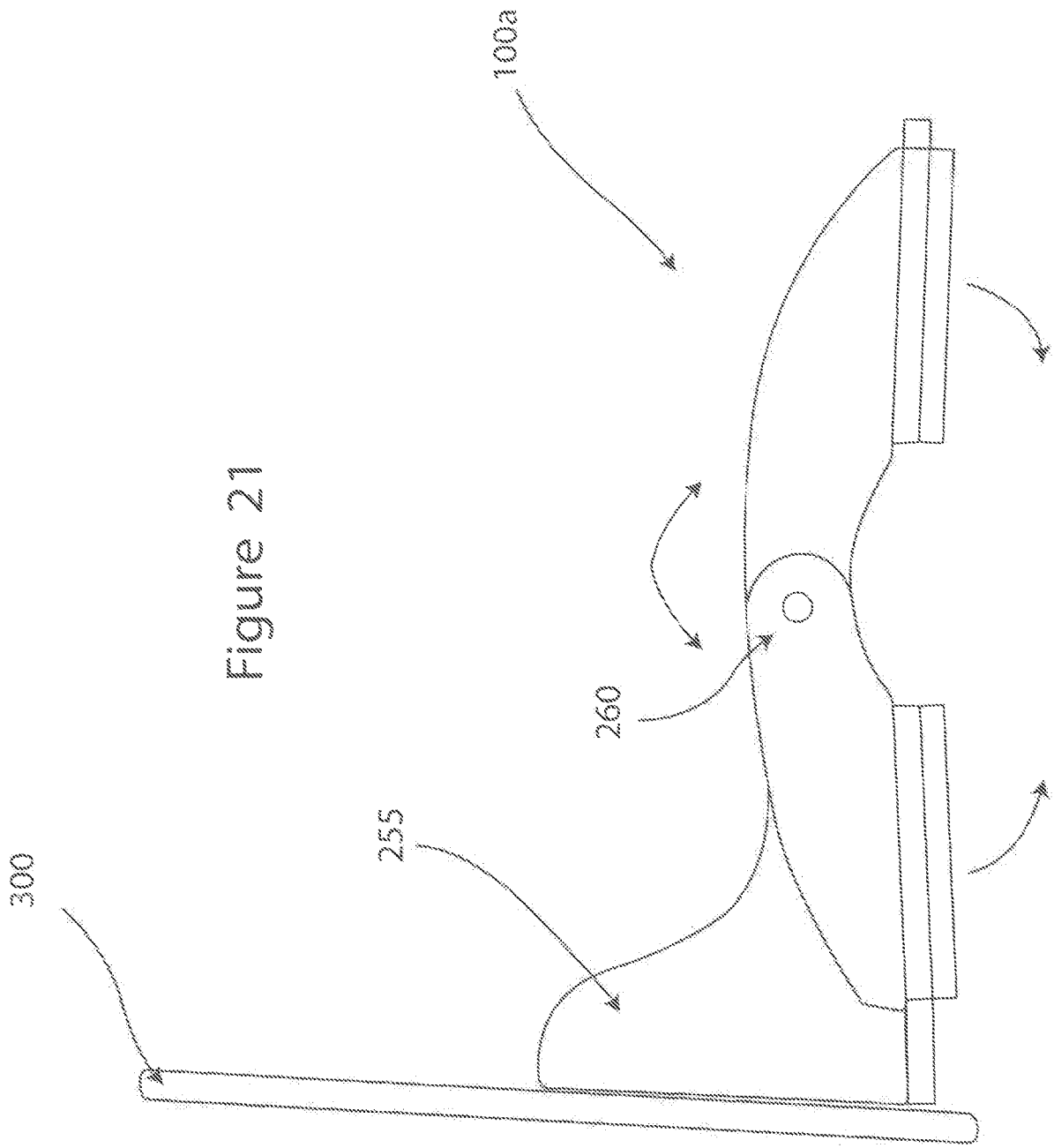
FIG. 21 is side view of an embodiment of the present disclosure having an adjustable base that includes another pivot joint.

Referring now to FIG. 21, the pivot connection 260 can optionally comprise a second pivot joint having a second pivot axis. In other embodiments, the pivot connection 260 includes both the first and second pivot joints. In FIG. 21, the pivot connection has only the second pivot joint. The second pivot joint enables pivoting the apparatus 10 in either a first direction or a second direction. In particular, when the apparatus 10 is pivoted in the first direction, the first 105a and second 105b suction cups pivot toward each other. When the apparatus 10 is pivoted in the second direction, the first 105a and second 105b suction cups pivot away from each other.

Figure 22:
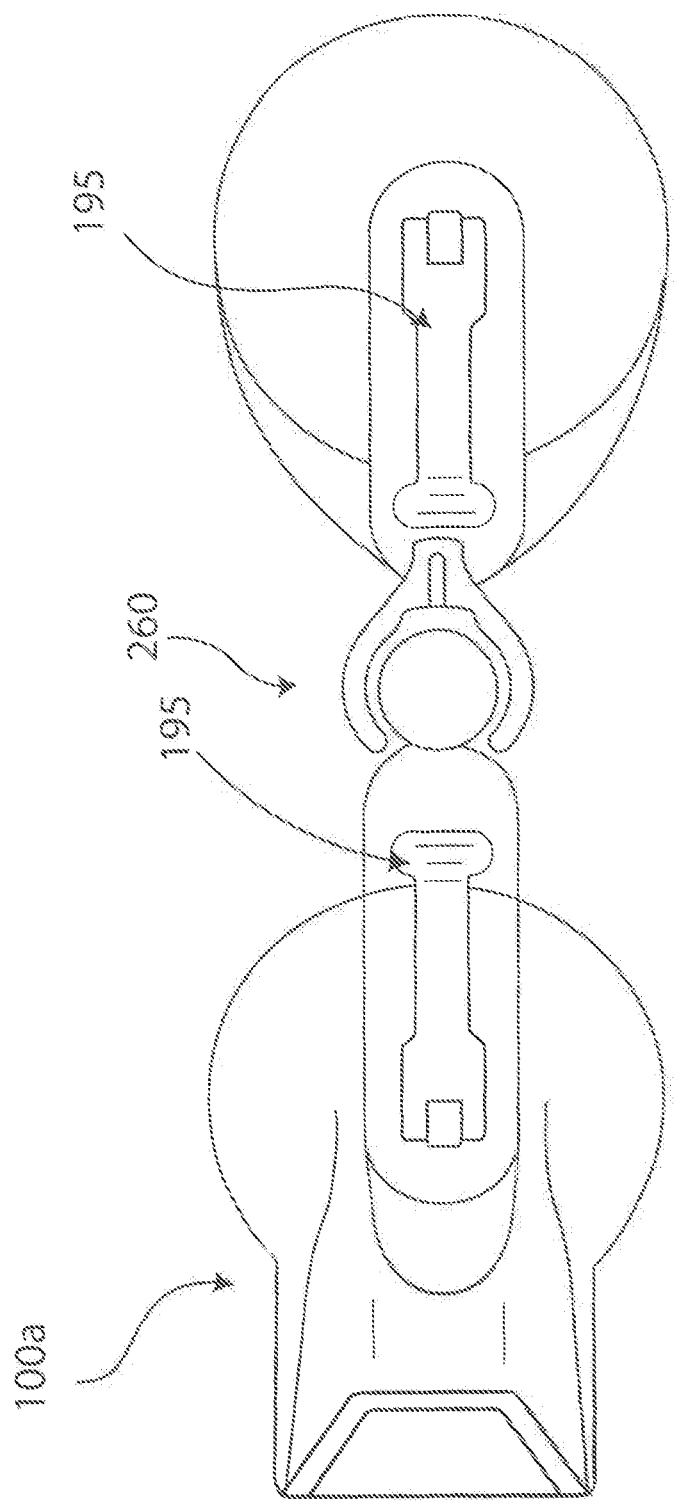
FIG. 22 is a top view of an embodiment of the present disclosure having an adjustable base that includes a ball joint.

The pivot connection 260 can optionally comprise a ball joint, as shown in FIG. 22. When provided, the ball joint preferably is located between the first 115 and second 120 end regions of the adjustable base 100a and preferably is configured to enable pivotal movement between the first 115 and second 120 end regions.

It is to be appreciated that the adjustable base structure need not be provided in all embodiments of the invention. However, any embodiment of the present disclosure can optionally be provided with an adjustable base structure of the nature described above.

Splash Deflector

Figure 23:
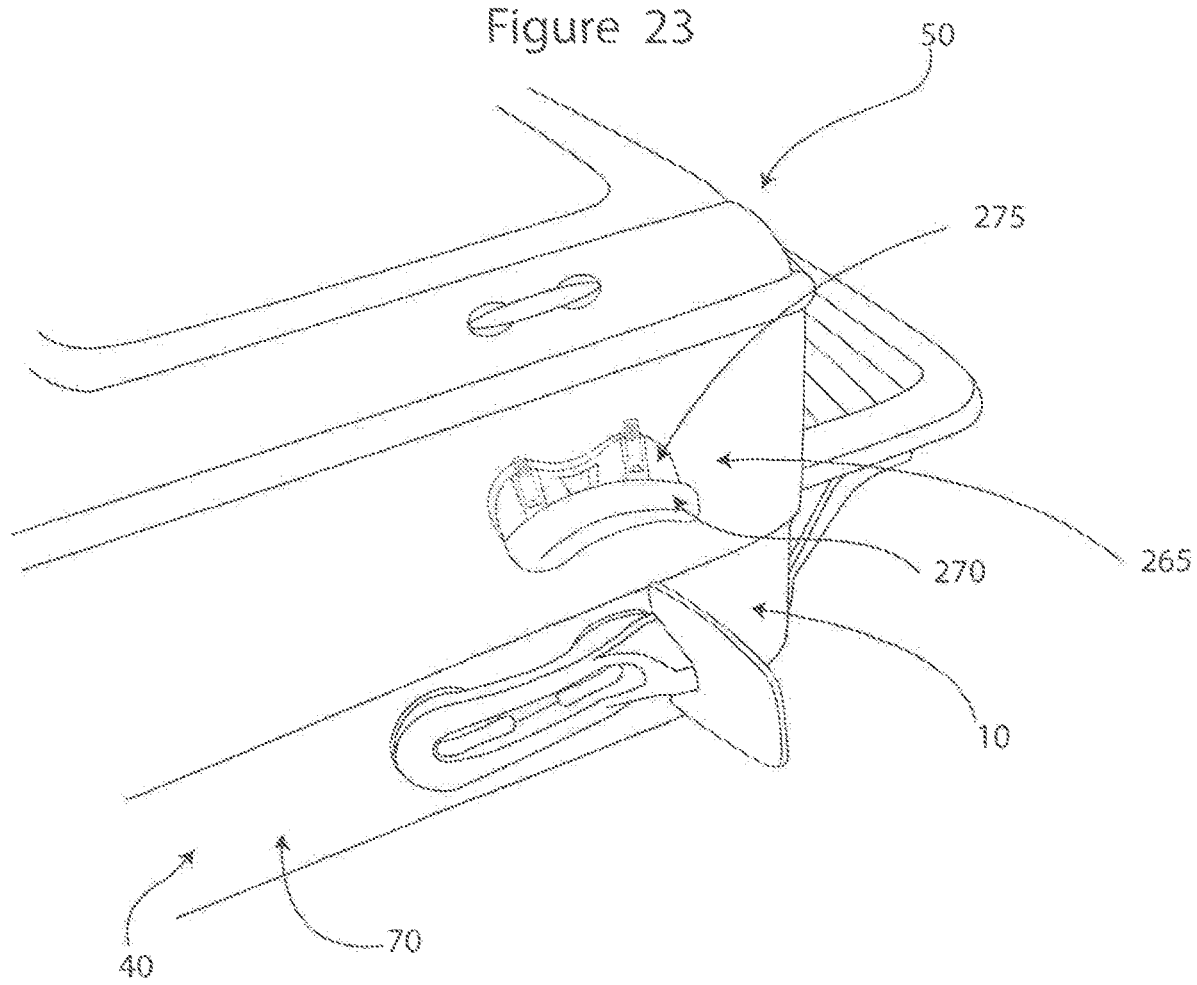
FIG. 23 is a perspective view of a wake shaping apparatus and an embodiment of a splash deflector having an arcuate splash wall, both mounted removably to a hull of a boat.
Figure 26:
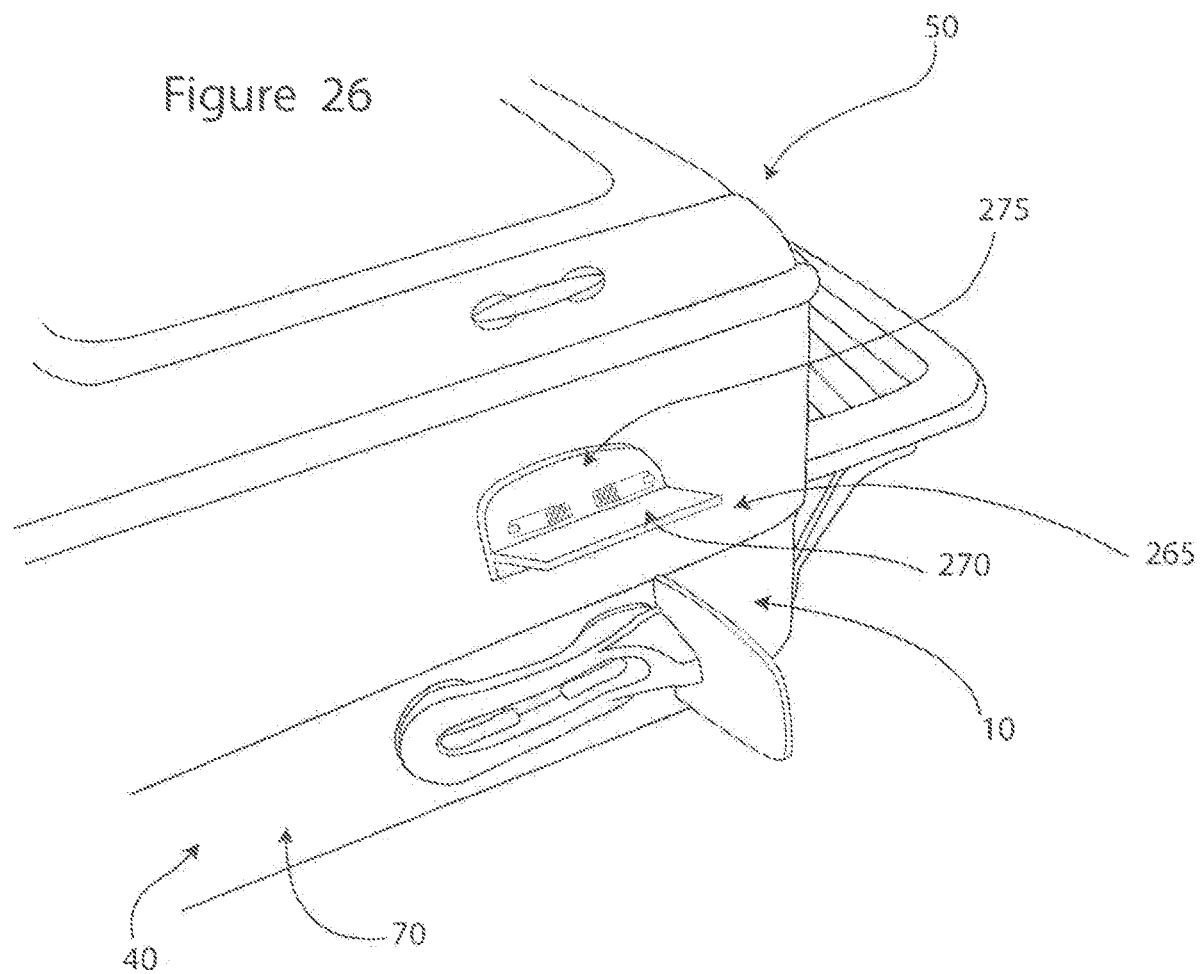
FIG. 26 is a perspective view of a wake shaping apparatus and an embodiment of a splash deflector having a planar splash wall, both mounted removably to a hull of a boat.
Figure 27:
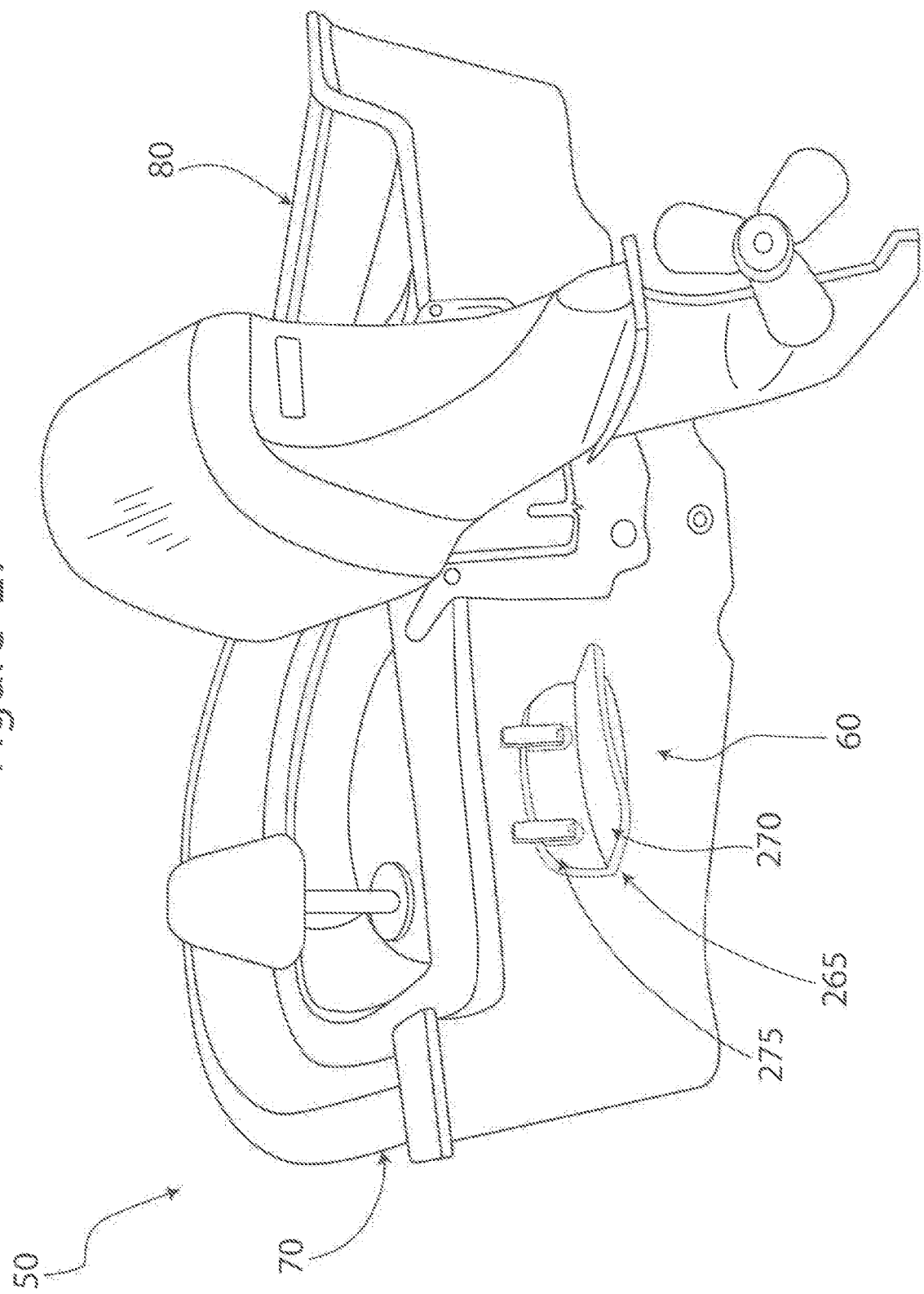
FIG. 27 is a perspective view of an embodiment of a splash deflector of the present disclosure having an arcuate splash wall mounted to a transom of a boat.

The invention also provides embodiments wherein a splash deflector 265 is mounted removably and non-invasively to a boat 50. The splash deflector 265 is intended to limit the splash of water adjacent to a region of the boat 50 where the splash deflector 265 is attached. The illustrated boat 50 has a transom 60 that extends between opposed sides 70, 80 of the hull 40. The splash deflector 265 can be mounted to the transom 60, as shown in FIG. 27, or to a desired one of the sides 70, 80 of the hull 40, as shown in FIGS. 23 and 26.

If desired, first and second splash deflectors can be mounted respectively on first and second sides of the hull.

Additionally or alternatively, first and second splash deflectors can be mounted on the transom of a boat. Given the present teaching as a guide, skilled artisans will appreciate that one or more splash deflectors can be provided at various locations on one or both sides of the hull and/or at various locations on the transom.

The splash deflector 265 comprises both a splash wall 270 and a mount wall 275. The splash wall 270 is attached to and projects outwardly from the mount wall 275. When the splash deflector 265 is attached to the hull 40 of a boat 50, the mount wall 275 is carried alongside the hull 40, and the splash wall 270 projects away from the hull 40. As shown in FIG. 26, the splash wall 270 can be planar, or at least generally planar, such that it extends away from the mount wall 275 in a generally perpendicular manner. Alternatively, as shown in FIGS. 23 and 27, the splash wall 270 can be arcuate, e.g., so as to form a curved fender configuration.

Figure 25:
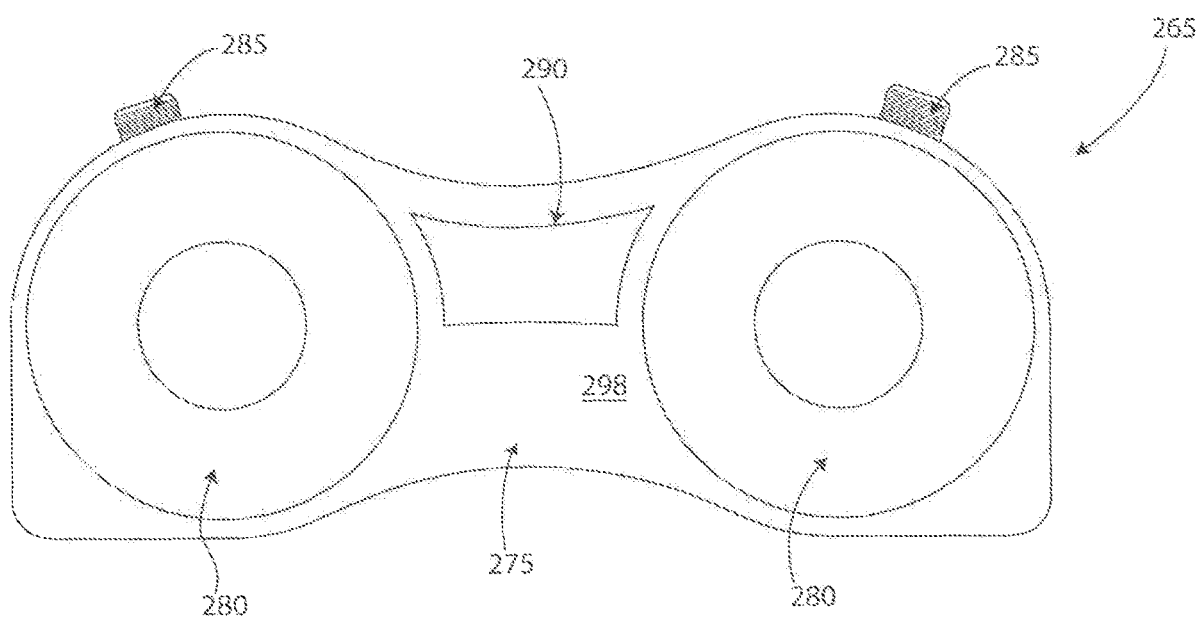
FIG. 25 is a bottom view of an embodiment of a splash deflector of the present disclosure.

The splash deflector 265 is removably mounted to a boat 50, preferably by one or more suction cups 280. In a preferred embodiment, the mount wall 275 of the splash deflector 265 includes two suction cups 280, as shown in FIG. 25. However, in other embodiments, the splash deflector 280 has only a single suction cup 280, or it has more than two suction cups 280. Moreover, instead of suction cups 280, the splash deflector 265 can be attached to the boat by other non-invasive and removable forms of mechanical attachment, such as hook and loop fasteners, magnets or the like.

Figure 24:
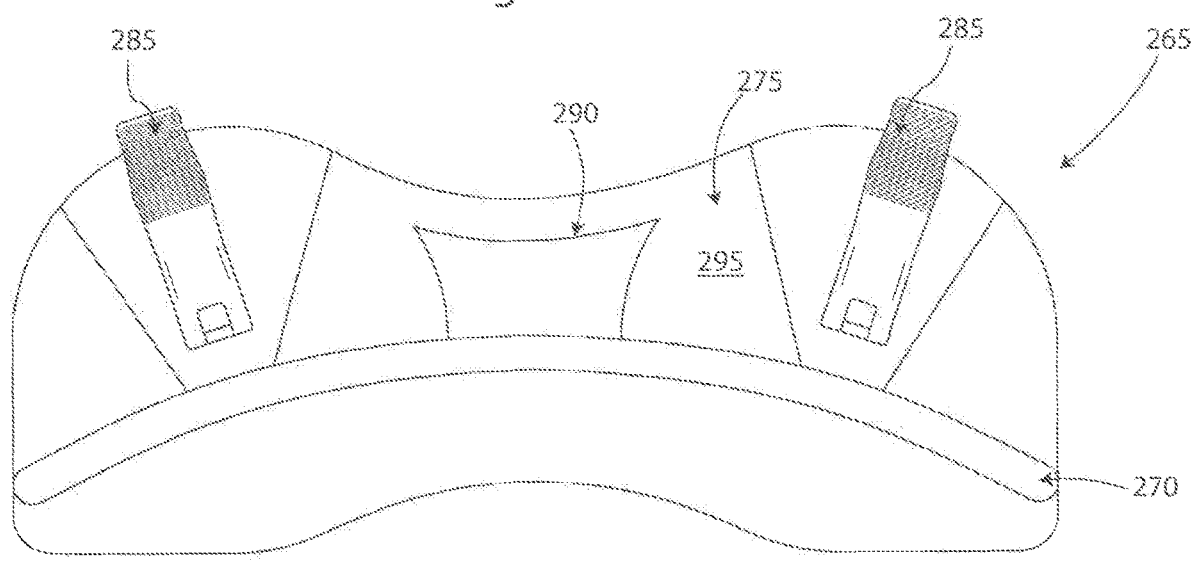
FIG. 24 is a front view of the splash deflector of FIG. 23.

Similar to the wake shaping apparatus 10, the splash deflector 265 can optionally include one or more levers 285 that control suction of the preferred suction cups 280. Preferably, one lever 285 is provided for each suction cup 280, as shown in FIG. 24. However, a single lever could alternatively be provided that controls suction for all suction cups on the mount wall. The lever 285 can be moved between a locked configuration and an unlocked configuration. In the locked configuration, each lever 285 activates suction for the respective suction cup 280. In the unlocked configuration, each lever 285 releases suction for the respective suction cup 280.

Preferably, the splash deflector 265 has an aperture 290 passing therethrough. When provided, the aperture 290 preferably is sized to facilitate manual handling and grasping of the splash deflector 265. In such cases, the aperture 290 is configured to receive four fingers of a person's hand. The mount wall 275 has a first surface 295 and a second surface 298. Preferably, the aperture 290 passes entirely through the mount wall 275 from its first surface 295 to its second surface 298, as shown in FIG. 23. In other embodiments, however, the aperture comprises a blind bore such that the aperture passes only partially between the first surface and the second surface of the mount wall The splash deflector 265 can be used with or without the wake shaping apparatus 10. When the splash deflector 265 and the wake shaping apparatus 10 are used in combination, the splash deflector 265 is positioned above the apparatus 10, as shown in FIG. 27. Such positioning of the splash deflector 265 can advantageously limit the amount of water from the apparatus 10 that splashes into the boat 50.

In certain embodiments, the splash deflector and the wake shaping apparatus are two discrete components that can be removably attached to each other during use. Removable attachment of the splash deflector and the wake shaping apparatus can be accomplished by various conventional means, including, but not limited to, a mounting wall (not shown) attached to both the splash deflector and the apparatus by screws or other fasteners.

In other embodiments, the splash deflector and the apparatus are integrally formed such that they define a one-piece structure. For example, a mounting wall can be provided that fixedly attaches the splash deflector to the wake shaping apparatus.

Adjustable Blade

In some embodiments, an angular orientation of the blade 300 (e.g., relative to the base 100) can be adjusted. This feature allows the blade 300 to be adjusted so as to project away from the base 100 at different angles to provide various effects on the wake. In the present embodiments, the blade 300 has at least first and second orientations. In the first orientation, the blade 300 projects away from the base 100 at a first angle. In the second orientation, the blade 300 projects away from the base 300 at a second angle. The first and second angles are different. Preferably, the blade 300 is pivotable between the first and second orientations via a hinge 380. The hinge 380 can be a simple hinge, as shown in FIG. 30, or a virtual hinge, as shown in FIG. 31.

The blade 300 further includes a mounting plate 385. The mounting plate 385 is attached to the blade 300 (e.g., is attached to a primary wall portion of the blade), e.g., via the hinge 380, preferably such that the hinge 380 enables the blade 300 (or a primary wall portion thereof) to pivot relative to the mounting plate 385. Similar to the first 355 and second 360 plates described above, the mounting plate 385 can be removably mounted in a channel 165 defined by the base 100. In some embodiments, the mounting plate 385 is attached directly to the blade 300 (e.g., to a primary wall portion thereof) via the hinge 380.

Figure 30:
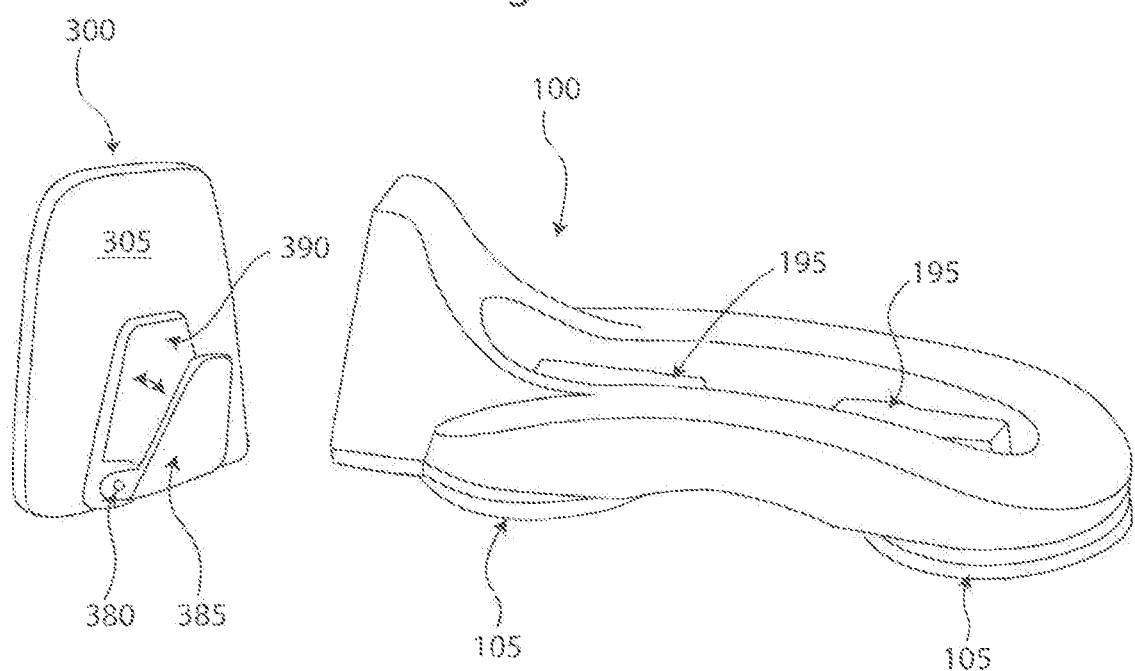
FIG. 30 is a perspective view of an embodiment of a wake shaping apparatus of the present disclosure in which a blade has an adjustable hinge.
Figure 31:
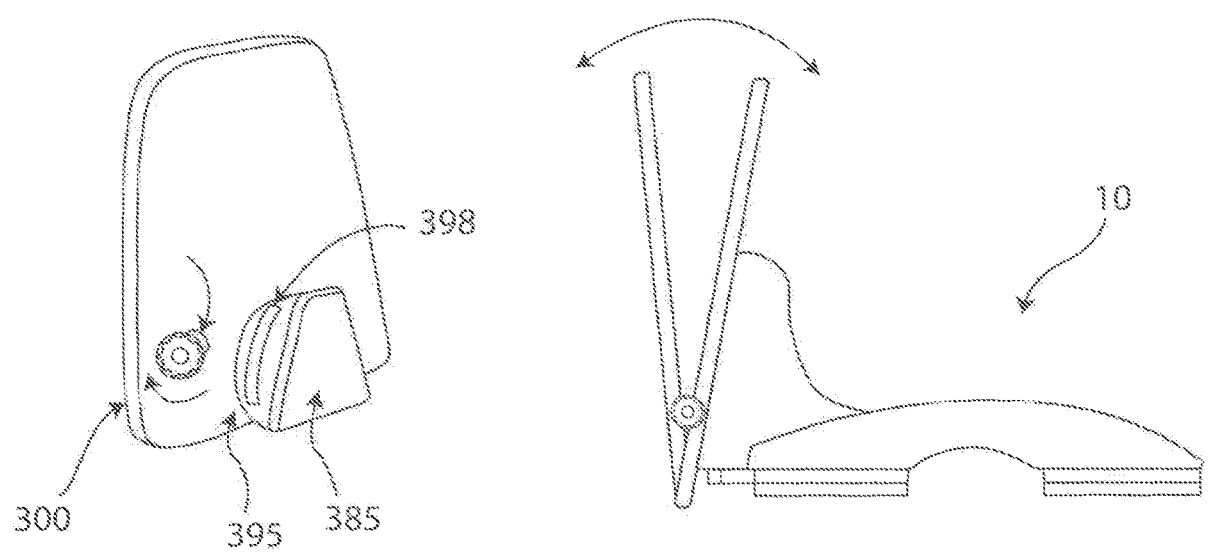
FIG. 31 is a perspective view of an embodiment of a wake shaping apparatus of the present disclosure in which a blade has a virtual hinge, as well as a side view showing the blade attached to the base.

As shown in FIG. 30, an optional base plate 390 can be provided. The base plate 390, for example, can be attached to the blade 300 (e.g., to a primary wall portion thereof) between the blade 300 (e.g., a primary wall portion thereof) and the mounting plate 385. In FIG. 30, the mounting plate 385 is hingedly attached to the base plate 390 such that the mounting plate 385 is pivotable relative to the base plate 390.

As discussed above, FIG. 31 shows a virtual hinge allowing the blade 300 to pivot between the at least first and second orientations. In some embodiments having a virtual hinge, the mounting plate 385 has a projection 395 extending outwardly therefrom. The projection 395 of the mounting plate 385 can have a slot 398 disposed therein. Preferably, the projection 395 is a semi-circle, and/or the slot 398 is arcuate, as shown in FIG. 31. However, other shapes for both the projection 395 and the slot 398 are contemplated.

In a preferred embodiment, a knob and bolt structure is provided. In certain embodiments, two walls (not shown) are attached to and extend between the blade 300 and the mounting plate 385. One or more bolts can be attached to the walls. One or two knobs can be provided, and each knob is attached to an end of the respective bolt. The bolt(s) are received in the slot 398 and are movable along a length of the slot 398. Tightening of the bolts permits the mounting plate 385 and the blade 300 to be locked at a desired angle relative to each other.

Blade with Channels

Figure 32:
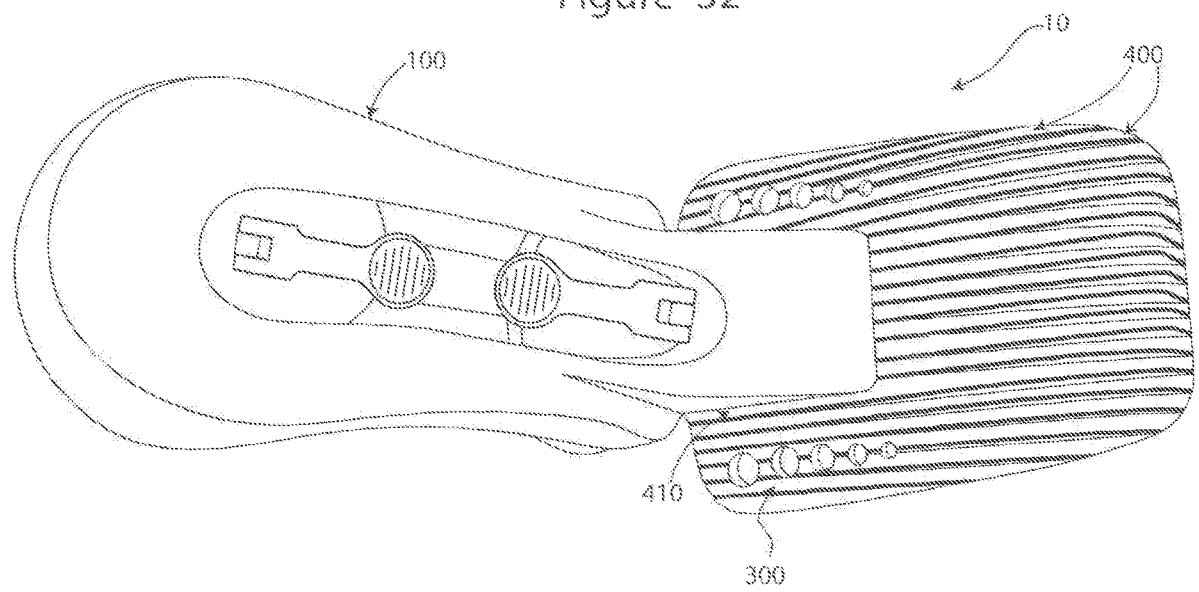
FIG. 32 is a top perspective view of an embodiment of a wake shaping apparatus of the present disclosure having a blade with channels.
Figure 33:
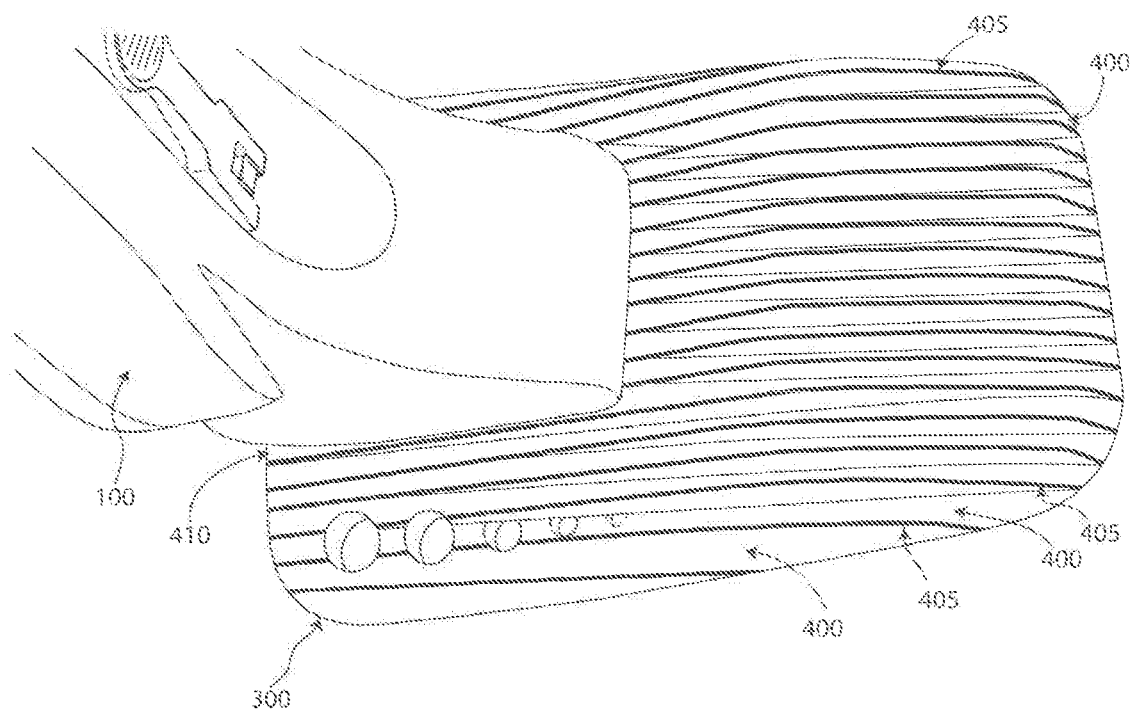
FIG. 33 is a detailed perspective view of the embodiment of FIG. 32.

Referring to FIGS. 32 and 33, in certain embodiments the blade 300 has a plurality of channels 400. The channels 400 preferably are integral to the blade 300 in that the blade 300 defines walls 405 bounding the channels 400. When the blade 300 is attached to the base 100, the channels 400 (or at least some of the channels) on the blade 300 preferably extend generally away from the base 100.

The channels 400 have a configuration designed to impact water flow along the blade. For example, the shape, size and orientation of the channels 400 may affect the shape of the wake. The channels 400 can be provided on either or both faces 305, 310 of the blade 300. The channels 400 can have different configurations on each face 305, 310 in order to provide different effects depending upon which face 305, 310 of the blade 300 faces the base 100.

The channels 400 on a single blade 300 can all be uniform in size. Alternatively, the channels 400 on the blade 300 can be different in size. Where the channels 400 on the blade 300 are uniformly sized, the channels 400 can all be customized so they are smaller or larger as desired to affect performance.

Additionally, the walls defining the channels 400 can optionally project outwardly from the blade 300 at a 90-degree angle, or they can form any angle with the blade 300 that is greater than zero. In certain embodiments, all the channels 400 on a given side of the blade are uniform in orientation and size. Alternatively, in some embodiments, the orientations of certain channels 400 on the blade 300 and/or the sizes of certain channels 400 are not uniform. Certain embodiments provide one side of the blade with channels of a given configuration, while channels on the other side of the blade have a different configuration.

In FIGS. 32 and 33, all of the channels 400 are at least generally parallel to one other. Thus, the channels 400 can optionally be parallel to one another along an entire lengthwise extent of the blade 300. Although the channels 400 are shown as extending in straight lines across the blade 300, at least some (or all) of the channels 400 may instead be curved, e.g., one or more of them may have curved portions.

The illustrated blade 300 further includes a mount region 410 configured to be carried against the base 100. The mount region 410 preferably is devoid of channels 400 so as not to interfere with mounting the blade 300 to the base 100. Depending on the particular embodiment, the mount region 410 can be an area on the blade 300 where an optional adapter component 325, mount structure 340, mounting plate 385, and/or base plate 390 are disposed.

Deployable Lanyard Assembly

In some embodiments, the invention provides a lanyard assembly 530. Referring to FIGS. 34-37, one example of the lanyard assembly 530 comprises a tether portion 535 and a float portion 540. The tether portion 535 comprises a tether line 555 configured for attaching to a cleat 560 on a boat 50. The tether line 555 can comprise a rope, bungee cord or the like. The float portion 540 comprises both a float 545 and a float line 550. The float line 550 can comprise a rope, bungee cord or the like and is configured for attaching to the base 100 of the apparatus 10. In some cases, the float line 550 can be attached to a lanyard eyelet 235 of the base 100.

Figure 34:
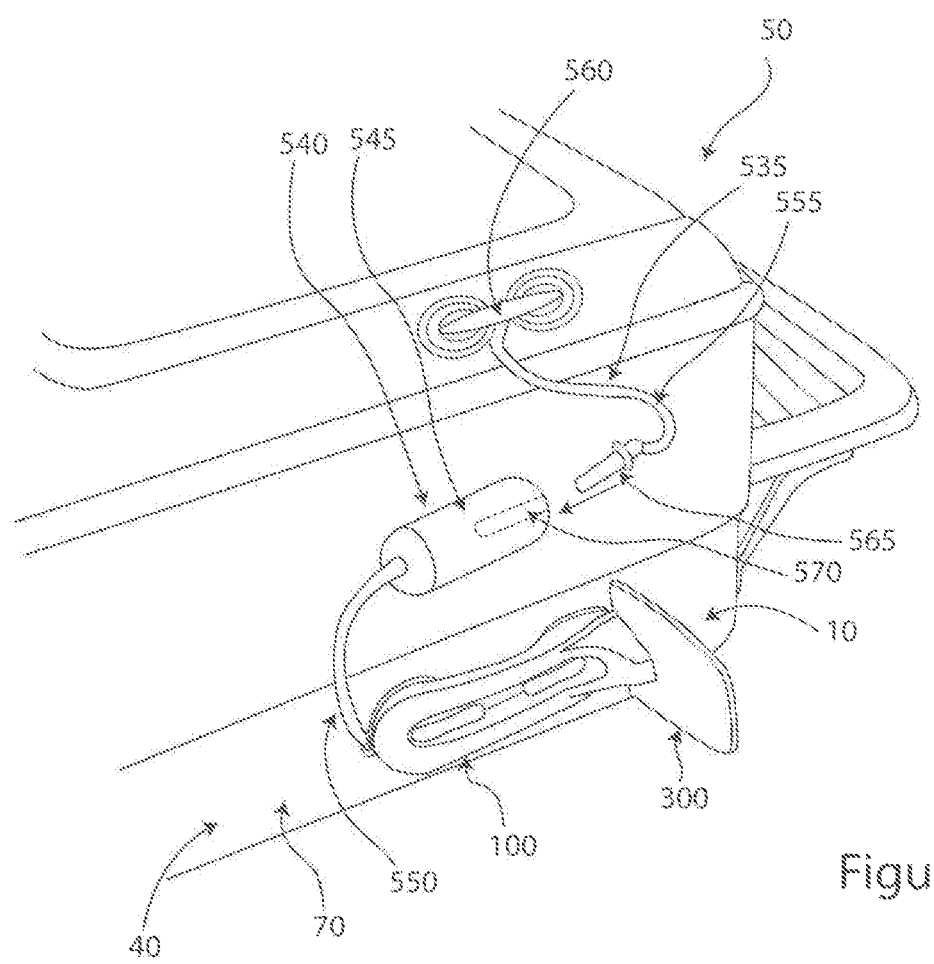
FIG. 34 is a perspective view of an embodiment of both a wake shaping apparatus and a deployable lanyard assembly in which a float portion of the lanyard assembly is attached to the wake shaping apparatus and a tether portion of the lanyard assembly attached to a cleat on a boat.
Figure 35:
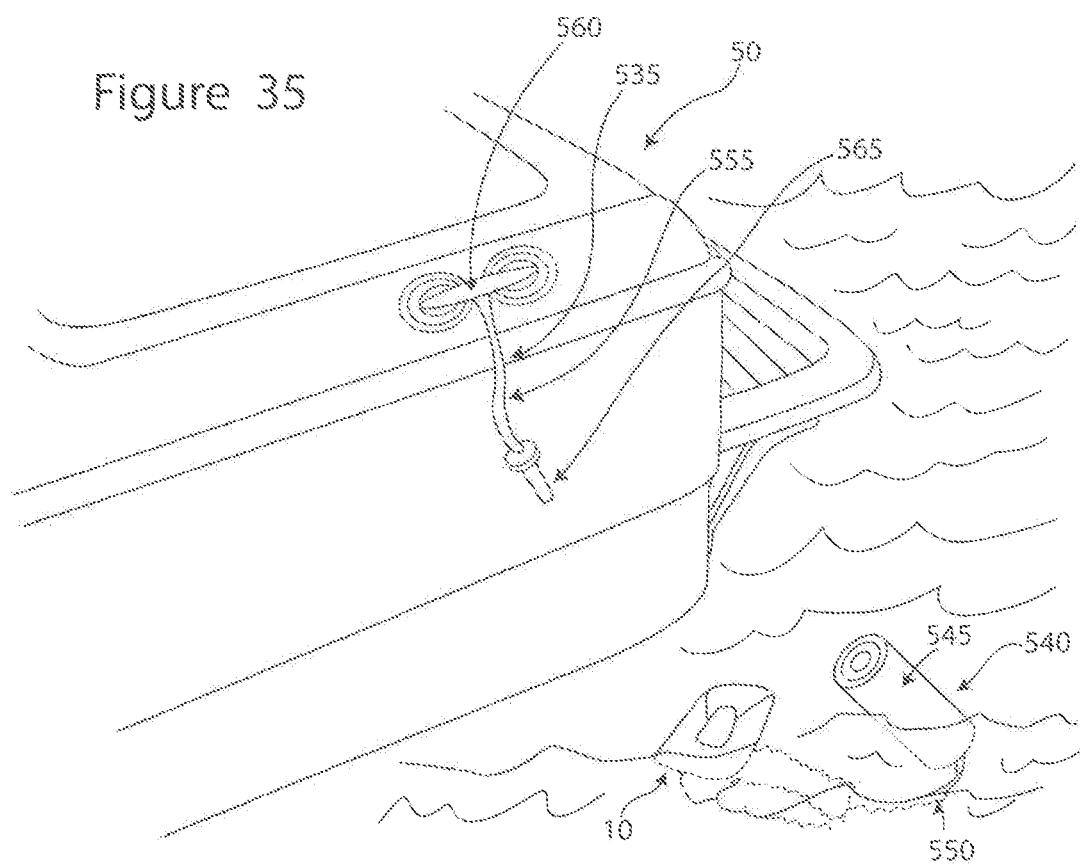
FIG. 35 is a perspective view of the lanyard assembly of FIG. 34 where the float portion and the tether portion are separated.

Preferably, the tether portion 535 and the float portion 540 are configured to be connected (and in FIG. 34, are connected) to each other by a friction joint. For example, the tether portion 535 can optionally comprise a male detent (e.g., a tongue) 565 and the float portion 540 can comprise a female detent 570. Alternatively, the male detent can be provided on the float portion while the female portion is provided on the tether position. In such cases, the male 565 and female 570 detents collectively define the friction joint. Various other friction joint structures can alternatively be used.

The tether line 555 has first 575 and second 580 ends. The first end 575 of the tether line 555 is configured to be attached to a cleat 560 on a boat 50. The second end 580 of the tether line 555 can optionally have a tongue 585. The float line 550 also has first 590 and second 595 ends. The first end 590 of the float line 550 is configured to be attached to the float 545. The second end 595 of the float line 550 is configured to be attached to the base 100. For example, in some cases the second end of the float line 550 is configured to be attached to a lanyard eyelet 235 of a wake shaping apparatus 10. The float 545 has front 600 and rear 605 ends. In the embodiment illustrated, the rear end 605 of the float 545 has an opening 610. The second end 595 of the illustrated float line 550 also has an opening 615. The tongue 585 of the tether line 555 can be received in both openings 610, 615 so as to provide a friction fit therebetween.

Figure 36:
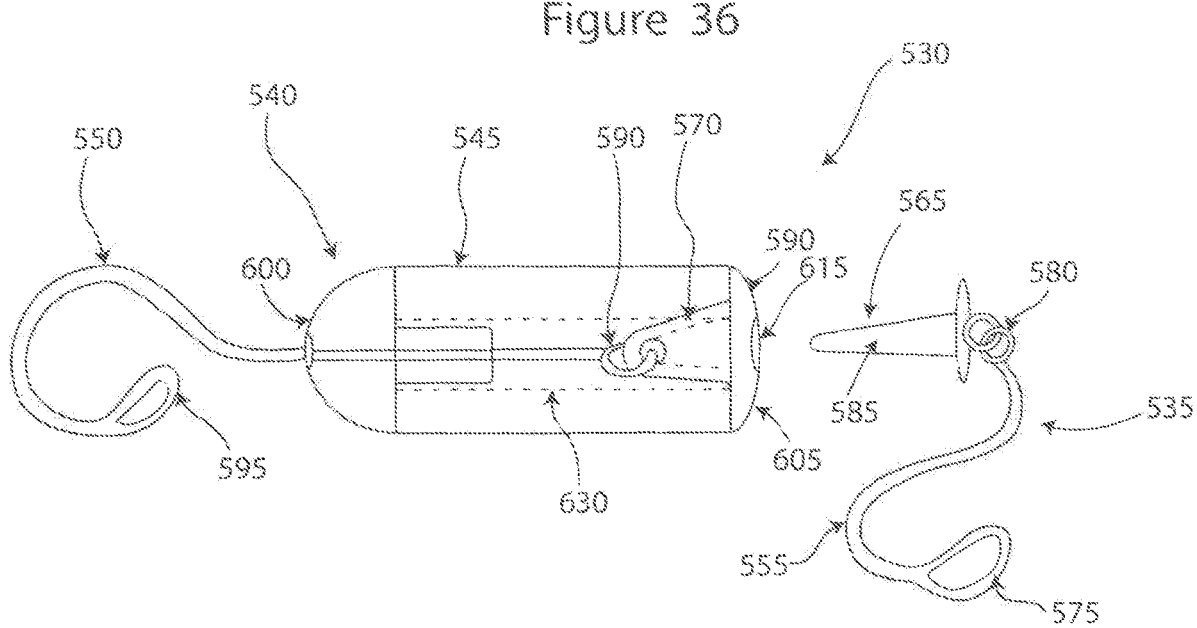
FIG. 36 is a side detail view of the deployable lanyard assembly of FIG. 34.
Figure 37:
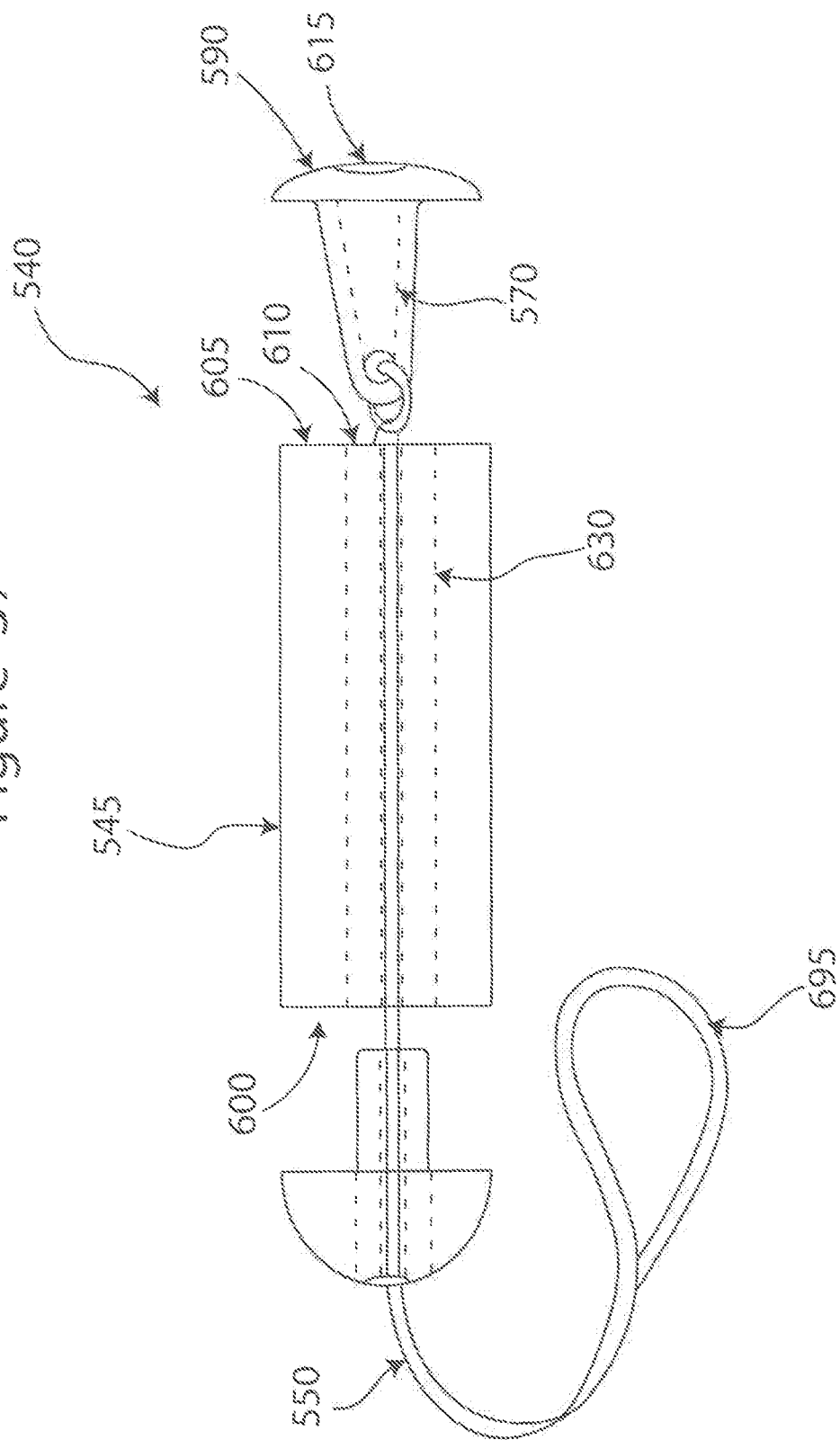
FIG. 37 is a partially exploded side view of the deployable lanyard assembly of FIG. 36.

The float 545 is buoyant such that it is configured to float on water. In a preferred embodiment, the float 645 is a foam material (e.g., a closed foam). However, the float 645 can comprise virtually any buoyant material, e.g., an inflatable plastic, so long as the float 545 is capable of providing buoyancy in water. As shown in FIGS. 36 and 37, the float 545 has a bore (e.g., an axial bore) 630 extending between the front 600 and rear 605 ends thereof. Here, the tether line 555 extends through the bore 630 of the float 545.

Inflatable Wake Shaper Apparatus

In certain embodiments, the invention provides a wake shaping apparatus 10 that is an inflatable apparatus 10b. In such cases, the apparatus (at least when inflated) preferably can float on water. As used in the present disclosure, the term "inflatable apparatus" refers to an apparatus that can transition between a non-inflated state and an inflated state. The means for inflating the inflatable apparatus 10b can be air or other gas, water or other liquid, or a combination of gas and liquid. In some cases, the apparatus 10b is configured to have a varied internal pressure of gas or liquid (i.e., it can be inflated to different extents) to create multiple but intentional effects, such as different shapes and/or angles of the apparatus 10b.

Figure 38:
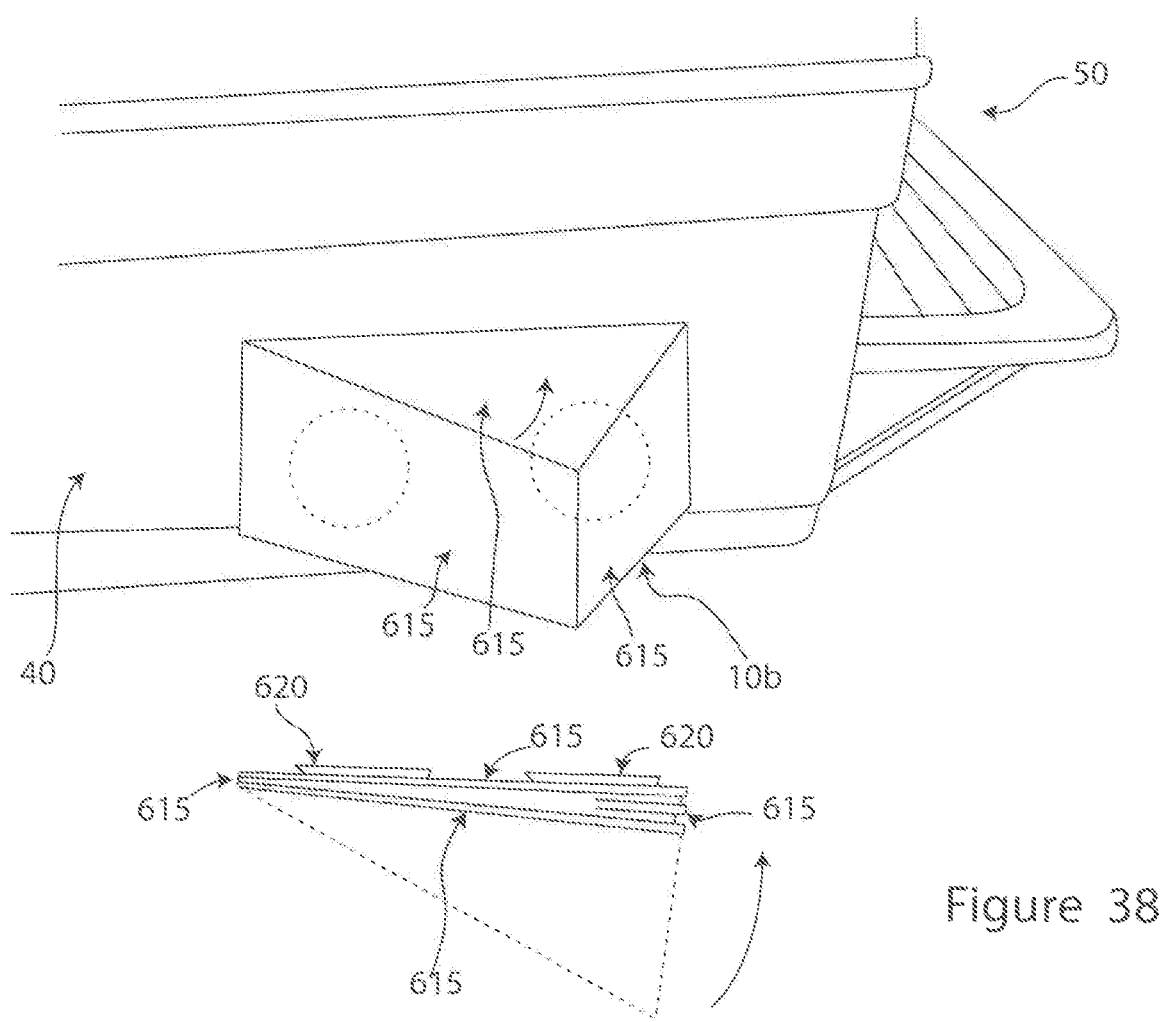
FIG. 38 shows two views of an embodiment of an inflatable wake shaping apparatus in inflated and non-inflated states so as to schematically illustrate how the apparatus transitions between the two states.

Referring to FIGS. 38 and 39, the inflatable apparatus 10b has a plurality of walls 615. In some embodiments, none of the walls 615 are rigid. In other embodiments, one or more of the walls 615 are rigid to help define a shape of the apparatus 10b. For example, while being inflated, the apparatus 10b can optionally expand until one of the rigid walls forms a desired angle with an adjacent non-rigid wall. The extent of expansion, and thus, the angle the rigid wall forms with the adjacent non-rigid wall, can optionally depend on a volume of gas and/or liquid introduced into the apparatus 10b. Where the apparatus 10b includes multiple rigid walls, the apparatus 10b can be inflated to different extents such that the walls form different angles relative to each other. For instance, each rigid wall can form a unique, desired angle with an adjacent non-rigid wall. FIGS. 38 and 39 also show that the apparatus 10b can in some cases be completely or substantially flattened when fully deflated, e.g., to permit compact storage of the apparatus 10b.

In some embodiments, the apparatus 10b is empty and void of any internal structure. In other embodiments, the apparatus 10b has inner chambers to provide rigidity, provide ballast and/or help define an inflated shape of the apparatus 10b. Additionally, the apparatus 10b can include internal structural elements that are independent of gas or liquid. Such internal structure could include drop stitch technology, in which tethers, such as strings or ropes, are attached to two or more walls 615 that define the shape of the apparatus 10b. These tethers can optionally be flexible in a non-pressurized compressed environment. However, when the apparatus 10b is inflated, the tethers may become taut and prevent the walls 615 from extending beyond an intentional length, thus confining the apparatus 10b to a desired pressurized shape.

As shown in FIG. 40, the apparatus 10b is used in combination with a boat 50 and can be attached to various locations on the boat 50. For example, the apparatus 10b can be attached to a single side 70, 80 of the hull 40. Alternatively, two inflatable apparatuses 10b can be used such that one apparatus 10b is attached to one side 70 of the hull 40 while another apparatus 10b is attached to the other side 80 of the hull 40. Each apparatus 10b can be permanently or removably attached to the boat 50. Preferably, the apparatus 10b is attached to the boat 50 by at least one, and preferably two, suction cups 620. This, however, is by no means required. It is also contemplated that the apparatus 10b can include only a single suction cup 620, or more than two suction cups 620. Alternatively, other removable and non-invasive forms of mechanical attachment, such as magnets, hook and loop fasteners or the like, can be provided for securing the apparatus 10b to the hull 40 of a boat 50.

Where two inflatable apparatuses 10b are used on a boat 50, each apparatus 10b can have an independent source (or a common source) of gas and/or liquid as the means for inflation. As shown in FIG. 40, this source can include a controller 625 to regulate a volume of gas and/or liquid distributed into each apparatus 10b by increasing or decreasing the pressure of the gas and/or liquid. These pressure changes can occur with the use of conventional valves in either an open or contained system. Such a system could have one or more gas or liquid pumps to operate the system to achieve desired levels. The system could also be an intake and dump-type siphon system, in which movement of the boat 50 is used as a means of intake to pressurize the system. Deflating or dumping pressure can be accomplished, for example, by pump or generator, natural aspiration allowing pressure inside the source container to equalize naturally, and/or with the assistance of motion of the boat 50 and force inflicted on the outside of the source containers.

Such a system, as described above, would allow switching from operation of one inflatable apparatus 10b on one side 70 of the hull 40 to operation of the other apparatus 10b on the opposite side 80 of the hull 40 as needed. Thus, a selected one or more of the inflatable apparatuses 10b can be inflated, or all of the inflatable apparatuses 10b can remain in their uninflated states. Advantageously, this system creates the desired effect of either virtually elongating one side 70, 80 of the hull 40 or intentionally destroying wake development on one side of the boat 50. Both effects can be used to generate mismatched wake conversion, and therefore, larger wake development for one side of the boat 50 relative to the other side of the boat 50.

Thus, embodiments of the wake shaping apparatus are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. An apparatus configured to attach removably to a hull of a boat, the apparatus comprising a blade and an adjustable base, the adjustable base having first and second end regions, the adjustable base having first and second side regions extending between the first and second end regions, the first end region having a first suction cup and a first lever coupled to the first suction cup so as to be operable to activate and release suction for the first suction cup, the second end region having a second suction cup and a second lever coupled to the second suction cup so as to be operable to activate and release suction for the second suction cup, the adjustable base having a top side and a bottom side, the first and second suction cups being on the bottom side of the adjustable base such that when the apparatus is attached removably to the hull of the boat the bottom side of the adjustable base faces toward the hull while the top side of the adjustable base faces away from the hull, the blade configured to attach to the adjustable base such that the blade projects outwardly away from the adjustable base, the apparatus having a configuration in which the first end region of the adjustable base, the second region of the adjustable base, the first suction cup, the second suction cup, and the blade are all centered on a common axis, the first end region having a pivot connection with the second end region, the apparatus configured such that: (i) rotational orientations of the first and second end regions of the adjustable base relative to each other change in response to pivoting the first end region about the pivot connection relative to the second end region, and (ii) rotational orientations of the first and second suction cups relative to each other change in response to pivoting the first end region about the pivot connection relative to the second end region.

2. The apparatus of claim 1 wherein the apparatus is configured to attach removably to the hull of the boat such that once it is attached to the hull the apparatus is configured to disrupt water flow around the hull of the boat such that a wake created behind the boat during operation of the boat is larger, differently positioned, and/or differently shaped than when the boat is operated without the apparatus attached to the hull.

3. The apparatus of claim 1 wherein the apparatus is attached removably to the hull of the boat by the first and second suction cups such that the apparatus is configured to disrupt water flow around the hull of the boat such that a wake created behind the boat during operation of the boat is larger, differently positioned, and/or differently shaped than when the boat is operated without the apparatus attached to the hull.

4. The apparatus of claim 1 wherein the pivot connection comprises a first pivot joint, the first pivot joint having a first pivot axis.

5. The apparatus of claim 4 wherein the first pivot joint enables adjusting an orientation of the second end region relative to that of the first end region, such that the apparatus has first and second angular configurations, the first angular configuration characterized by the first and second end regions extending along a straight line relative to each other, the second angular configuration characterized by one of the first and second end regions projecting away from the other at a positive acute angle.

6. The apparatus of claim 4 wherein the first suction cup is configured to stay in a constant plane when the apparatus is moved between its first and second angular configurations, and the second suction cup is configured to stay in a constant plane when the apparatus is moved between its first and second angular configurations.

7. The apparatus of claim 4 wherein the pivot connection further comprises a second pivot joint, the second pivot joint having a second pivot axis.

8. The apparatus of claim 7 wherein the second pivot joint enables pivoting the apparatus in either of two directions, such that when the apparatus is pivoted in a first direction the first and second suction cups pivot toward each other, and when the apparatus is pivoted in a second direction the first and second suction cups pivot away from each other.

9. The apparatus of claim 8 wherein the first and second pivot axes are substantially perpendicular to each other.

10. The apparatus of claim 1 wherein the blade is plate shaped.

11. The apparatus of claim 1 wherein, in response to pivoting the adjustable base at the pivot connection, the first and second suction cups are configured to be positioned in a confronting angle configuration such that bottom faces of the first and second suction cups are angled inwardly toward each other.

12. The apparatus of claim 1 wherein the first end region of the adjustable base has a greater height than the second end region of the adjustable base.

\* \* \* \* \*